US010749300B2

(12) United States Patent
Shi et al.

(10) Patent No.: US 10,749,300 B2
(45) Date of Patent: Aug. 18, 2020

(54) POGO CONNECTOR BASED SOFT POWER START SOLUTION

(71) Applicant: Hand Held Products, Inc., Fort Mill, SC (US)

(72) Inventors: Wei Shi, Jiangsu (CN); ZhiQiang Liu, Jiangsu (CN); Kop Liu, Huizhou (CN); Zhihua Dai, ShenZhen (CN)

(73) Assignee: HAND HELD PRODUCTS, INC., Fort Mill, SC (US)

( * ) Notice: Subject to any disclaimer, the term of this patent is extended or adjusted under 35 U.S.C. 154(b) by 26 days.

(21) Appl. No.: 16/057,326

(22) Filed: Aug. 7, 2018

(65) Prior Publication Data

US 2019/0052026 A1     Feb. 14, 2019

(30) Foreign Application Priority Data

Aug. 11, 2017   (CN) .......................... 2017 1 0685370

(51) Int. Cl.

| H01R 13/703 | (2006.01) |
|---|---|
| H02J 7/00 | (2006.01) |
| H01R 13/24 | (2006.01) |
| H01R 12/70 | (2011.01) |
| H01R 12/71 | (2011.01) |

(52) U.S. Cl.
CPC ..... *H01R 13/7036* (2013.01); *H01R 12/7088* (2013.01); *H01R 13/2421* (2013.01); *H02J 7/0045* (2013.01); *H01R 12/714* (2013.01); *H01R 2201/16* (2013.01); *H02J 7/0029* (2013.01); *H02J 7/0042* (2013.01)

(58) Field of Classification Search
CPC .......................... H01R 13/7036; H02J 7/0045
USPC .......................................................... 320/115
See application file for complete search history.

(56) References Cited

U.S. PATENT DOCUMENTS

| 6,241,537 B1 * | 6/2001 | Tate ................... H01R 13/6485 |
|---|---|---|
| | | 361/799 |
| 6,282,082 B1 * | 8/2001 | Armitage .................. G06F 1/16 |
| | | 312/223.2 |
| 6,832,725 B2 | 12/2004 | Gardiner et al. |
| 6,902,412 B2 | 6/2005 | Higgins |

(Continued)

FOREIGN PATENT DOCUMENTS

WO     2013163789 A1     11/2013

OTHER PUBLICATIONS

Ken Shirriff's Blog, "Teardown and exploration of Apple's Magsafe connector", Dated Jun. 2013 (downloaded Jan. 18, 2017 from http://www.righto.com/2013/06/teardown-and-exploration-of-magsafe.html) 9 pages.

*Primary Examiner* — Jerry D Robbins
(74) *Attorney, Agent, or Firm* — Alston & Bird LLP

(57) ABSTRACT

Systems and methods are disclosed for a soft power start solution based on a two pin connector for a device such as a mobile terminal. When a charging pad of the device is first docked to a charging cradle, the charging pad of the device is connected to a plunger in a ground pin, but power is not applied at that moment. In a separate step, the plunger is shorted to a spring flat that allows power to be applied to the charging pad. Similar steps occur during de-docking. With this method, contact interface burn caused by electrical arcing when docking or de-docking a mobile terminal from a charging cradle may be minimized.

20 Claims, 7 Drawing Sheets

(56) References Cited

U.S. PATENT DOCUMENTS

| | | |
|---|---|---|
| 7,128,266 B2 | 10/2006 | Zhu et al. |
| 7,159,783 B2 | 1/2007 | Walczyk et al. |
| 7,413,127 B2 | 8/2008 | Ehrhart et al. |
| 7,726,575 B2 | 6/2010 | Wang et al. |
| 8,294,969 B2 | 10/2012 | Plesko |
| 8,317,105 B2 | 11/2012 | Kotlarsky et al. |
| 8,322,622 B2 | 12/2012 | Liu |
| 8,366,005 B2 | 2/2013 | Kotlarsky et al. |
| 8,371,507 B2 | 2/2013 | Haggerty et al. |
| 8,376,233 B2 | 2/2013 | Van Horn et al. |
| 8,381,979 B2 | 2/2013 | Franz |
| 8,390,909 B2 | 3/2013 | Plesko |
| 8,408,464 B2 | 4/2013 | Zhu et al. |
| 8,408,468 B2 | 4/2013 | Horn et al. |
| 8,408,469 B2 | 4/2013 | Good |
| 8,424,768 B2 | 4/2013 | Rueblinger et al. |
| 8,448,863 B2 | 5/2013 | Xian et al. |
| 8,457,013 B2 | 6/2013 | Essinger et al. |
| 8,459,557 B2 | 6/2013 | Havens et al. |
| 8,469,272 B2 | 6/2013 | Kearney |
| 8,474,712 B2 | 7/2013 | Kearney et al. |
| 8,479,992 B2 | 7/2013 | Kotlarsky et al. |
| 8,490,877 B2 | 7/2013 | Kearney |
| 8,517,271 B2 | 8/2013 | Kotlarsky et al. |
| 8,523,076 B2 | 9/2013 | Good |
| 8,528,818 B2 | 9/2013 | Ehrhart et al. |
| 8,544,737 B2 | 10/2013 | Gomez et al. |
| 8,548,420 B2 | 10/2013 | Grunow et al. |
| 8,550,335 B2 | 10/2013 | Samek et al. |
| 8,550,354 B2 | 10/2013 | Gannon et al. |
| 8,550,357 B2 | 10/2013 | Kearney |
| 8,556,174 B2 | 10/2013 | Kosecki et al. |
| 8,556,176 B2 | 10/2013 | Van Horn et al. |
| 8,556,177 B2 | 10/2013 | Hussey et al. |
| 8,559,767 B2 | 10/2013 | Barber et al. |
| 8,561,895 B2 | 10/2013 | Gomez et al. |
| 8,561,903 B2 | 10/2013 | Sauerwein |
| 8,561,905 B2 | 10/2013 | Edmonds et al. |
| 8,565,107 B2 | 10/2013 | Pease et al. |
| 8,571,307 B2 | 10/2013 | Li et al. |
| 8,579,200 B2 | 11/2013 | Samek et al. |
| 8,583,924 B2 | 11/2013 | Caballero et al. |
| 8,584,945 B2 | 11/2013 | Wang et al. |
| 8,587,595 B2 | 11/2013 | Wang |
| 8,587,697 B2 | 11/2013 | Hussey et al. |
| 8,588,869 B2 | 11/2013 | Sauerwein et al. |
| 8,590,789 B2 | 11/2013 | Nahill et al. |
| 8,596,539 B2 | 12/2013 | Havens et al. |
| 8,596,542 B2 | 12/2013 | Havens et al. |
| 8,596,543 B2 | 12/2013 | Havens et al. |
| 8,599,271 B2 | 12/2013 | Havens et al. |
| 8,599,957 B2 | 12/2013 | Peake et al. |
| 8,600,158 B2 | 12/2013 | Li et al. |
| 8,600,167 B2 | 12/2013 | Showering |
| 8,602,309 B2 | 12/2013 | Longacre et al. |
| 8,608,053 B2 | 12/2013 | Meier et al. |
| 8,608,071 B2 | 12/2013 | Liu et al. |
| 8,611,309 B2 | 12/2013 | Wang et al. |
| 8,615,487 B2 | 12/2013 | Gomez et al. |
| 8,621,123 B2 | 12/2013 | Caballero |
| 8,622,303 B2 | 1/2014 | Meier et al. |
| 8,628,013 B2 | 1/2014 | Ding |
| 8,628,015 B2 | 1/2014 | Wang et al. |
| 8,628,016 B2 | 1/2014 | Winegar |
| 8,629,926 B2 | 1/2014 | Wang |
| 8,630,491 B2 | 1/2014 | Longacre et al. |
| 8,635,309 B2 | 1/2014 | Berthiaume et al. |
| 8,636,200 B2 | 1/2014 | Kearney |
| 8,636,212 B2 | 1/2014 | Nahill et al. |
| 8,636,215 B2 | 1/2014 | Ding et al. |
| 8,636,224 B2 | 1/2014 | Wang |
| 8,638,806 B2 | 1/2014 | Wang et al. |
| 8,640,958 B2 | 2/2014 | Lu et al. |
| 8,640,960 B2 | 2/2014 | Wang et al. |
| 8,643,717 B2 | 2/2014 | Li et al. |
| 8,646,692 B2 | 2/2014 | Meier et al. |
| 8,646,694 B2 | 2/2014 | Wang et al. |
| 8,657,200 B2 | 2/2014 | Ren et al. |
| 8,659,397 B2 | 2/2014 | Vargo et al. |
| 8,668,149 B2 | 3/2014 | Good |
| 8,678,285 B2 | 3/2014 | Kearney |
| 8,678,286 B2 | 3/2014 | Smith et al. |
| 8,682,077 B1 | 3/2014 | Longacre |
| D702,237 S | 4/2014 | Oberpriller et al. |
| 8,687,282 B2 | 4/2014 | Feng et al. |
| 8,692,927 B2 | 4/2014 | Pease et al. |
| 8,695,880 B2 | 4/2014 | Bremer et al. |
| 8,698,949 B2 | 4/2014 | Grunow et al. |
| 8,702,000 B2 | 4/2014 | Barber et al. |
| 8,717,494 B2 | 5/2014 | Gannon |
| 8,720,783 B2 | 5/2014 | Biss et al. |
| 8,723,804 B2 | 5/2014 | Fletcher et al. |
| 8,723,904 B2 | 5/2014 | Marty et al. |
| 8,727,223 B2 | 5/2014 | Wang |
| 8,740,082 B2 | 6/2014 | Wilz |
| 8,740,085 B2 | 6/2014 | Furlong et al. |
| 8,746,563 B2 | 6/2014 | Hennick et al. |
| 8,750,445 B2 | 6/2014 | Peake et al. |
| 8,752,766 B2 | 6/2014 | Xian et al. |
| 8,756,059 B2 | 6/2014 | Braho et al. |
| 8,757,495 B2 | 6/2014 | Qu et al. |
| 8,760,563 B2 | 6/2014 | Koziol et al. |
| 8,763,909 B2 | 7/2014 | Reed et al. |
| 8,777,108 B2 | 7/2014 | Coyle |
| 8,777,109 B2 | 7/2014 | Oberpriller et al. |
| 8,779,898 B2 | 7/2014 | Havens et al. |
| 8,781,520 B2 | 7/2014 | Payne et al. |
| 8,783,573 B2 | 7/2014 | Havens et al. |
| 8,789,757 B2 | 7/2014 | Barten |
| 8,789,758 B2 | 7/2014 | Hawley et al. |
| 8,789,759 B2 | 7/2014 | Xian et al. |
| 8,794,520 B2 | 8/2014 | Wang et al. |
| 8,794,522 B2 | 8/2014 | Ehrhart |
| 8,794,525 B2 | 8/2014 | Amundsen et al. |
| 8,794,526 B2 | 8/2014 | Wang et al. |
| 8,798,367 B2 | 8/2014 | Ellis |
| 8,807,431 B2 | 8/2014 | Wang et al. |
| 8,807,432 B2 | 8/2014 | Van Horn et al. |
| 8,820,630 B2 | 9/2014 | Qu et al. |
| 8,822,848 B2 | 9/2014 | Meagher |
| 8,824,692 B2 | 9/2014 | Sheerin et al. |
| 8,824,696 B2 | 9/2014 | Braho |
| 8,842,849 B2 | 9/2014 | Wahl et al. |
| 8,844,822 B2 | 9/2014 | Kotlarsky et al. |
| 8,844,823 B2 | 9/2014 | Fritz et al. |
| 8,849,019 B2 | 9/2014 | Li et al. |
| D716,285 S | 10/2014 | Chaney et al. |
| 8,851,383 B2 | 10/2014 | Yeakley et al. |
| 8,854,633 B2 | 10/2014 | Laffargue |
| 8,866,963 B2 | 10/2014 | Grunow et al. |
| 8,868,421 B2 | 10/2014 | Braho et al. |
| 8,868,519 B2 | 10/2014 | Maloy et al. |
| 8,868,802 B2 | 10/2014 | Barten |
| 8,868,803 B2 | 10/2014 | Caballero |
| 8,870,074 B1 | 10/2014 | Gannon |
| 8,879,639 B2 | 11/2014 | Sauerwein |
| 8,880,426 B2 | 11/2014 | Smith |
| 8,881,983 B2 | 11/2014 | Havens et al. |
| 8,881,987 B2 | 11/2014 | Wang |
| 8,903,172 B2 | 12/2014 | Smith |
| 8,908,995 B2 | 12/2014 | Benos et al. |
| 8,910,870 B2 | 12/2014 | Li et al. |
| 8,910,875 B2 | 12/2014 | Ren et al. |
| 8,914,290 B2 | 12/2014 | Hendrickson et al. |
| 8,914,788 B2 | 12/2014 | Pettinelli et al. |
| 8,915,439 B2 | 12/2014 | Feng et al. |
| 8,915,444 B2 | 12/2014 | Havens et al. |
| 8,916,789 B2 | 12/2014 | Woodburn |
| 8,918,250 B2 | 12/2014 | Hollifield |
| 8,918,564 B2 | 12/2014 | Caballero |
| 8,925,818 B2 | 1/2015 | Kosecki et al. |
| 8,939,374 B2 | 1/2015 | Jovanovski et al. |
| 8,942,480 B2 | 1/2015 | Ellis |
| 8,944,313 B2 | 2/2015 | Williams et al. |

(56) References Cited

U.S. PATENT DOCUMENTS

| | | |
|---|---|---|
| 8,944,327 B2 | 2/2015 | Meier et al. |
| 8,944,332 B2 | 2/2015 | Harding et al. |
| 8,950,678 B2 | 2/2015 | Germaine et al. |
| D723,560 S | 3/2015 | Zhou et al. |
| 8,967,468 B2 | 3/2015 | Gomez et al. |
| 8,971,346 B2 | 3/2015 | Sevier |
| 8,976,030 B2 | 3/2015 | Cunningham et al. |
| 8,976,368 B2 | 3/2015 | Akel et al. |
| 8,978,981 B2 | 3/2015 | Guan |
| 8,978,983 B2 | 3/2015 | Bremer et al. |
| 8,978,984 B2 | 3/2015 | Hennick et al. |
| 8,985,456 B2 | 3/2015 | Zhu et al. |
| 8,985,457 B2 | 3/2015 | Soule et al. |
| 8,985,459 B2 | 3/2015 | Kearney et al. |
| 8,985,461 B2 | 3/2015 | Gelay et al. |
| 8,988,578 B2 | 3/2015 | Showering |
| 8,988,590 B2 | 3/2015 | Gillet et al. |
| 8,991,704 B2 | 3/2015 | Hopper et al. |
| 8,996,194 B2 | 3/2015 | Davis et al. |
| 8,996,384 B2 | 3/2015 | Funyak et al. |
| 8,998,091 B2 | 4/2015 | Edmonds et al. |
| 9,002,641 B2 | 4/2015 | Showering |
| 9,007,368 B2 | 4/2015 | Laffargue et al. |
| 9,010,641 B2 | 4/2015 | Qu et al. |
| 9,015,513 B2 | 4/2015 | Murawski et al. |
| 9,016,576 B2 | 4/2015 | Brady et al. |
| D730,357 S | 5/2015 | Fitch et al. |
| 9,022,288 B2 | 5/2015 | Nahill et al. |
| 9,030,964 B2 | 5/2015 | Essinger et al. |
| 9,033,240 B2 | 5/2015 | Smith et al. |
| 9,033,242 B2 | 5/2015 | Gillet et al. |
| 9,036,054 B2 | 5/2015 | Koziol et al. |
| 9,037,344 B2 | 5/2015 | Chamberlin |
| 9,038,911 B2 | 5/2015 | Xian et al. |
| 9,038,915 B2 | 5/2015 | Smith |
| D730,901 S | 6/2015 | Oberpriller et al. |
| D730,902 S | 6/2015 | Fitch et al. |
| 9,047,098 B2 | 6/2015 | Barten |
| 9,047,359 B2 | 6/2015 | Caballero et al. |
| 9,047,420 B2 | 6/2015 | Caballero |
| 9,047,525 B2 | 6/2015 | Barber |
| 9,047,531 B2 | 6/2015 | Showering et al. |
| 9,049,640 B2 | 6/2015 | Wang et al. |
| 9,053,055 B2 | 6/2015 | Caballero |
| 9,053,378 B1 | 6/2015 | Hou et al. |
| 9,053,380 B2 | 6/2015 | Xian et al. |
| 9,057,641 B2 | 6/2015 | Amundsen et al. |
| 9,058,526 B2 | 6/2015 | Powilleit |
| 9,061,527 B2 | 6/2015 | Tobin et al. |
| 9,064,165 B2 | 6/2015 | Havens et al. |
| 9,064,167 B2 | 6/2015 | Xian et al. |
| 9,064,168 B2 | 6/2015 | Todeschini et al. |
| 9,064,254 B2 | 6/2015 | Todeschini et al. |
| 9,066,032 B2 | 6/2015 | Wang |
| 9,070,032 B2 | 6/2015 | Corcoran |
| D734,339 S | 7/2015 | Zhou et al. |
| D734,751 S | 7/2015 | Oberpriller et al. |
| 9,076,459 B2 | 7/2015 | Braho et al. |
| 9,079,423 B2 | 7/2015 | Bouverie et al. |
| 9,080,856 B2 | 7/2015 | Laffargue |
| 9,082,023 B2 | 7/2015 | Feng et al. |
| 9,084,032 B2 | 7/2015 | Rautiola et al. |
| 9,087,250 B2 | 7/2015 | Coyle |
| 9,092,681 B2 | 7/2015 | Havens et al. |
| 9,092,682 B2 | 7/2015 | Wilz et al. |
| 9,092,683 B2 | 7/2015 | Koziol et al. |
| 9,093,141 B2 | 7/2015 | Liu |
| 9,098,763 B2 | 8/2015 | Lu et al. |
| 9,104,929 B2 | 8/2015 | Todeschini |
| 9,104,934 B2 | 8/2015 | Li et al. |
| 9,107,484 B2 | 8/2015 | Chaney |
| 9,111,159 B2 | 8/2015 | Liu et al. |
| 9,111,166 B2 | 8/2015 | Cunningham |
| 9,135,483 B2 | 9/2015 | Liu et al. |
| 9,137,009 B1 | 9/2015 | Gardiner |
| 9,141,839 B2 | 9/2015 | Xian et al. |
| 9,147,096 B2 | 9/2015 | Wang |
| 9,148,474 B2 | 9/2015 | Skvoretz |
| 9,158,000 B2 | 10/2015 | Sauerwein |
| 9,158,340 B2 | 10/2015 | Reed et al. |
| 9,158,953 B2 | 10/2015 | Gillet et al. |
| 9,159,059 B2 | 10/2015 | Daddabbo et al. |
| 9,165,174 B2 | 10/2015 | Huck |
| 9,171,543 B2 | 10/2015 | Emerick et al. |
| 9,183,425 B2 | 11/2015 | Wang |
| 9,189,669 B2 | 11/2015 | Zhu et al. |
| 9,195,844 B2 | 11/2015 | Todeschini et al. |
| 9,202,458 B2 | 12/2015 | Braho et al. |
| 9,208,366 B2 | 12/2015 | Liu |
| 9,208,367 B2 | 12/2015 | Wang |
| 9,219,836 B2 | 12/2015 | Bouverie et al. |
| 9,224,022 B2 | 12/2015 | Ackley et al. |
| 9,224,024 B2 | 12/2015 | Bremer et al. |
| 9,224,027 B2 | 12/2015 | Van Horn et al. |
| D747,321 S | 1/2016 | London et al. |
| 9,230,140 B1 | 1/2016 | Ackley |
| 9,235,553 B2 | 1/2016 | Fitch et al. |
| 9,239,950 B2 | 1/2016 | Fletcher |
| 9,245,492 B2 | 1/2016 | Ackley et al. |
| 9,443,123 B2 | 1/2016 | Hejl |
| 9,248,640 B2 | 2/2016 | Heng |
| 9,250,652 B2 | 2/2016 | London et al. |
| 9,250,712 B1 | 2/2016 | Todeschini |
| 9,251,411 B2 | 2/2016 | Todeschini |
| 9,258,033 B2 | 2/2016 | Showering |
| 9,262,633 B1 | 2/2016 | Todeschini et al. |
| 9,262,660 B2 | 2/2016 | Lu et al. |
| 9,262,662 B2 | 2/2016 | Chen et al. |
| 9,269,036 B2 | 2/2016 | Bremer |
| 9,270,782 B2 | 2/2016 | Hala et al. |
| 9,274,812 B2 | 3/2016 | Doren et al. |
| 9,275,388 B2 | 3/2016 | Havens et al. |
| 9,277,668 B2 | 3/2016 | Feng et al. |
| 9,280,693 B2 | 3/2016 | Feng et al. |
| 9,286,496 B2 | 3/2016 | Smith |
| 9,297,900 B2 | 3/2016 | Jiang |
| 9,298,964 B2 | 3/2016 | Li et al. |
| 9,301,427 B2 | 3/2016 | Feng et al. |
| 9,304,376 B2 | 4/2016 | Anderson |
| 9,310,609 B2 | 4/2016 | Rueblinger et al. |
| 9,313,377 B2 | 4/2016 | Todeschini et al. |
| 9,317,037 B2 | 4/2016 | Byford et al. |
| D757,009 S | 5/2016 | Oberpriller et al. |
| 9,342,723 B2 | 5/2016 | Liu et al. |
| 9,342,724 B2 | 5/2016 | McCloskey |
| 9,361,882 B2 | 6/2016 | Ressler et al. |
| 9,365,381 B2 | 6/2016 | Colonel et al. |
| 9,373,018 B2 | 6/2016 | Colavito et al. |
| 9,375,945 B1 | 6/2016 | Bowles |
| 9,378,403 B2 | 6/2016 | Wang et al. |
| D760,719 S | 7/2016 | Zhou et al. |
| 9,360,304 B2 | 7/2016 | Chang et al. |
| 9,383,848 B2 | 7/2016 | Daghigh |
| 9,384,374 B2 | 7/2016 | Bianconi |
| 9,390,596 B1 | 7/2016 | Todeschini |
| D762,604 S | 8/2016 | Fitch et al. |
| 9,411,386 B2 | 8/2016 | Sauerwein |
| 9,412,242 B2 | 8/2016 | Van Horn et al. |
| 9,418,269 B2 | 8/2016 | Havens et al. |
| 9,418,270 B2 | 8/2016 | Van Volkinburg et al. |
| 9,423,318 B2 | 8/2016 | Lui et al. |
| D766,244 S | 9/2016 | Zhou et al. |
| 9,443,222 B2 | 9/2016 | Singel et al. |
| 9,454,689 B2 | 9/2016 | McCloskey et al. |
| 9,464,885 B2 | 10/2016 | Lloyd et al. |
| 9,465,384 B1 | 10/2016 | Jain et al. |
| 9,465,967 B2 | 10/2016 | Xian et al. |
| 9,478,113 B2 | 10/2016 | Xie et al. |
| 9,478,983 B2 | 10/2016 | Kather et al. |
| D771,631 S | 11/2016 | Fitch et al. |
| 9,481,186 B2 | 11/2016 | Bouverie et al. |
| 9,488,986 B1 | 11/2016 | Solanki |
| 9,489,782 B2 | 11/2016 | Payne et al. |
| 9,490,540 B1 | 11/2016 | Davies et al. |

(56) References Cited

U.S. PATENT DOCUMENTS

| | | |
|---|---|---|
| 9,491,729 B2 | 11/2016 | Rautiola et al. |
| 9,497,092 B2 | 11/2016 | Gomez et al. |
| 9,507,974 B1 | 11/2016 | Todeschini |
| 9,519,814 B2 | 12/2016 | Cudzilo |
| 9,521,331 B2 | 12/2016 | Bessettes et al. |
| 9,530,038 B2 | 12/2016 | Xian et al. |
| D777,166 S | 1/2017 | Bidwell et al. |
| 9,558,386 B2 | 1/2017 | Yeakley |
| 9,572,901 B2 | 2/2017 | Todeschini |
| 9,606,581 B1 | 3/2017 | Howe et al. |
| D783,601 S | 4/2017 | Schulte et al. |
| D785,617 S | 5/2017 | Bidwell et al. |
| D785,636 S | 5/2017 | Oberpriller et al. |
| 9,646,189 B2 | 5/2017 | Lu et al. |
| 9,646,191 B2 | 5/2017 | Unemyr et al. |
| 9,652,648 B2 | 5/2017 | Ackley et al. |
| 9,652,653 B2 | 5/2017 | Todeschini et al. |
| 9,656,487 B2 | 5/2017 | Ho et al. |
| 9,659,198 B2 | 5/2017 | Giordano et al. |
| D790,505 S | 6/2017 | Vargo et al. |
| D790,546 S | 6/2017 | Zhou et al. |
| 9,680,282 B2 | 6/2017 | Hanenburg |
| 9,697,401 B2 | 7/2017 | Feng et al. |
| 9,701,140 B1 | 7/2017 | Alaganchetty et al. |
| 9,818,274 B2 * | 11/2017 | Fawcett .............. G08B 13/1463 |
| 10,101,770 B2 * | 10/2018 | Schatz .................. G06F 1/1632 |
| 2007/0063048 A1 | 3/2007 | Havens et al. |
| 2009/0134221 A1 | 5/2009 | Zhu et al. |
| 2010/0177076 A1 | 7/2010 | Essinger et al. |
| 2010/0177080 A1 | 7/2010 | Essinger et al. |
| 2010/0177707 A1 | 7/2010 | Essinger et al. |
| 2010/0177749 A1 | 7/2010 | Essinger et al. |
| 2010/0221960 A1 * | 9/2010 | Chung ............... G01R 1/06722 439/733.1 |
| 2011/0169999 A1 | 7/2011 | Grunow et al. |
| 2011/0202554 A1 | 8/2011 | Powilleit et al. |
| 2012/0111946 A1 | 5/2012 | Golant |
| 2012/0168512 A1 | 7/2012 | Kotlarsky et al. |
| 2012/0193423 A1 | 8/2012 | Samek |
| 2012/0202390 A1 * | 8/2012 | Park ..................... H01R 12/714 439/700 |
| 2012/0203647 A1 | 8/2012 | Smith |
| 2012/0223141 A1 | 9/2012 | Good et al. |
| 2013/0043312 A1 | 2/2013 | Van Horn |
| 2013/0075168 A1 | 3/2013 | Amundsen et al. |
| 2013/0175341 A1 | 7/2013 | Kearney et al. |
| 2013/0175343 A1 | 7/2013 | Good |
| 2013/0257744 A1 | 10/2013 | Daghigh et al. |
| 2013/0257759 A1 | 10/2013 | Daghigh |
| 2013/0270346 A1 | 10/2013 | Xian et al. |
| 2013/0292475 A1 | 11/2013 | Kotlarsky et al. |
| 2013/0292477 A1 | 11/2013 | Hennick et al. |
| 2013/0293539 A1 | 11/2013 | Hunt et al. |
| 2013/0293540 A1 | 11/2013 | Laffargue et al. |
| 2013/0306728 A1 | 11/2013 | Thuries et al. |
| 2013/0306731 A1 | 11/2013 | Pedraro |
| 2013/0307964 A1 | 11/2013 | Bremer et al. |
| 2013/0308625 A1 | 11/2013 | Park et al. |
| 2013/0313324 A1 | 11/2013 | Koziol et al. |
| 2013/0332524 A1 | 12/2013 | Fiala et al. |
| 2014/0001267 A1 | 1/2014 | Giordano et al. |
| 2014/0002828 A1 | 1/2014 | Laffargue et al. |
| 2014/0025584 A1 | 1/2014 | Liu et al. |
| 2014/0100813 A1 | 1/2014 | Showering |
| 2014/0034734 A1 | 2/2014 | Sauerwein |
| 2014/0039693 A1 | 2/2014 | Havens et al. |
| 2014/0049120 A1 | 2/2014 | Kohtz et al. |
| 2014/0049635 A1 | 2/2014 | Laffargue et al. |
| 2014/0061306 A1 | 3/2014 | Wu et al. |
| 2014/0063289 A1 | 3/2014 | Hussey et al. |
| 2014/0066136 A1 | 3/2014 | Sauerwein et al. |
| 2014/0067692 A1 | 3/2014 | Ye et al. |
| 2014/0070005 A1 | 3/2014 | Nahill et al. |
| 2014/0071840 A1 | 3/2014 | Venancio |
| 2014/0074746 A1 | 3/2014 | Wang |
| 2014/0076974 A1 | 3/2014 | Havens et al. |
| 2014/0078342 A1 | 3/2014 | Li et al. |
| 2014/0098792 A1 | 4/2014 | Wang et al. |
| 2014/0100774 A1 | 4/2014 | Showering |
| 2014/0103115 A1 | 4/2014 | Meier et al. |
| 2014/0104413 A1 | 4/2014 | McCloskey et al. |
| 2014/0104414 A1 | 4/2014 | McCloskey et al. |
| 2014/0104416 A1 | 4/2014 | Giordano et al. |
| 2014/0106725 A1 | 4/2014 | Sauerwein |
| 2014/0108010 A1 | 4/2014 | Maltseff et al. |
| 2014/0108402 A1 | 4/2014 | Gomez et al. |
| 2014/0108682 A1 | 4/2014 | Caballero |
| 2014/0110485 A1 | 4/2014 | Toa et al. |
| 2014/0114530 A1 | 4/2014 | Fitch et al. |
| 2014/0125853 A1 | 5/2014 | Wang |
| 2014/0125999 A1 | 5/2014 | Longacre et al. |
| 2014/0129378 A1 | 5/2014 | Richardson |
| 2014/0131443 A1 | 5/2014 | Smith |
| 2014/0131444 A1 | 5/2014 | Wang |
| 2014/0133379 A1 | 5/2014 | Wang et al. |
| 2014/0136208 A1 | 5/2014 | Maltseff et al. |
| 2014/0140585 A1 | 5/2014 | Wang |
| 2014/0152882 A1 | 6/2014 | Samek et al. |
| 2014/0158770 A1 | 6/2014 | Sevier et al. |
| 2014/0159869 A1 | 6/2014 | Zumsteg et al. |
| 2014/0166755 A1 | 6/2014 | Liu et al. |
| 2014/0166757 A1 | 6/2014 | Smith |
| 2014/0168787 A1 | 6/2014 | Wang et al. |
| 2014/0175165 A1 | 6/2014 | Havens et al. |
| 2014/0191913 A1 | 7/2014 | Ge et al. |
| 2014/0197239 A1 | 7/2014 | Havens et al. |
| 2014/0197304 A1 | 7/2014 | Feng et al. |
| 2014/0204268 A1 | 7/2014 | Grunow et al. |
| 2014/0214631 A1 | 7/2014 | Hansen |
| 2014/0217166 A1 | 8/2014 | Berthiaume et al. |
| 2014/0217180 A1 | 8/2014 | Liu |
| 2014/0231500 A1 | 8/2014 | Ehrhart et al. |
| 2014/0247315 A1 | 9/2014 | Marty et al. |
| 2014/0263493 A1 | 9/2014 | Amurgis et al. |
| 2014/0263645 A1 | 9/2014 | Smith et al. |
| 2014/0270196 A1 | 9/2014 | Braho et al. |
| 2014/0270229 A1 | 9/2014 | Braho |
| 2014/0278387 A1 | 9/2014 | DiGregorio |
| 2014/0282210 A1 | 9/2014 | Bianconi |
| 2014/0288933 A1 | 9/2014 | Braho et al. |
| 2014/0297058 A1 | 10/2014 | Barker et al. |
| 2014/0299665 A1 | 10/2014 | Barber et al. |
| 2014/0351317 A1 | 11/2014 | Smith et al. |
| 2014/0362184 A1 | 12/2014 | Jovanovski et al. |
| 2014/0363015 A1 | 12/2014 | Braho |
| 2014/0369511 A1 | 12/2014 | Sheerin et al. |
| 2014/0374483 A1 | 12/2014 | Lu |
| 2014/0374485 A1 | 12/2014 | Xian et al. |
| 2015/0001301 A1 | 1/2015 | Ouyang |
| 2015/0009338 A1 | 1/2015 | Laffargue et al. |
| 2015/0014416 A1 | 1/2015 | Kotlarsky et al. |
| 2015/0021397 A1 | 1/2015 | Rueblinger et al. |
| 2015/0028104 A1 | 1/2015 | Ma et al. |
| 2015/0029002 A1 | 1/2015 | Yeakley et al. |
| 2015/0032709 A1 | 1/2015 | Maloy et al. |
| 2015/0039309 A1 | 2/2015 | Braho et al. |
| 2015/0040378 A1 | 2/2015 | Saber et al. |
| 2015/0049347 A1 | 2/2015 | Laffargue et al. |
| 2015/0051992 A1 | 2/2015 | Smith |
| 2015/0053769 A1 | 2/2015 | Thuries et al. |
| 2015/0062366 A1 | 3/2015 | Liu et al. |
| 2015/0063215 A1 | 3/2015 | Wang |
| 2015/0088522 A1 | 3/2015 | Hendrickson et al. |
| 2015/0096872 A1 | 4/2015 | Woodburn |
| 2015/0100196 A1 | 4/2015 | Hollifield |
| 2015/0115035 A1 | 4/2015 | Meier et al. |
| 2015/0127791 A1 | 5/2015 | Kosecki et al. |
| 2015/0128116 A1 | 5/2015 | Chen et al. |
| 2015/0133047 A1 | 5/2015 | Smith et al. |
| 2015/0134470 A1 | 5/2015 | Hejl et al. |
| 2015/0136851 A1 | 5/2015 | Harding et al. |
| 2015/0142492 A1 | 5/2015 | Kumar |
| 2015/0144692 A1 | 5/2015 | Hejl |
| 2015/0144698 A1 | 5/2015 | Teng et al. |

(56) References Cited

U.S. PATENT DOCUMENTS

| | | |
|---|---|---|
| 2015/0149946 A1 | 5/2015 | Benos et al. |
| 2015/0161429 A1 | 6/2015 | Xian |
| 2015/0186703 A1 | 7/2015 | Chen et al. |
| 2015/0199957 A1 | 7/2015 | Funyak et al. |
| 2015/0210199 A1 | 7/2015 | Payne |
| 2015/0220753 A1 | 8/2015 | Zhu et al. |
| 2015/0254485 A1 | 9/2015 | Feng et al. |
| 2015/0310243 A1 | 10/2015 | Ackley |
| 2015/0310389 A1 | 10/2015 | Crimm et al. |
| 2015/0327012 A1 | 11/2015 | Bian et al. |
| 2016/0014251 A1 | 1/2016 | Hejl |
| 2016/0040982 A1 | 2/2016 | Li et al. |
| 2016/0042241 A1 | 2/2016 | Todeschini |
| 2016/0057230 A1 | 2/2016 | Todeschini et al. |
| 2016/0062473 A1 | 3/2016 | Bouchat et al. |
| 2016/0092805 A1 | 3/2016 | Geisler et al. |
| 2016/0101936 A1 | 4/2016 | Chamberlin |
| 2016/0102975 A1 | 4/2016 | McCloskey et al. |
| 2016/0104019 A1 | 4/2016 | Todeschini et al. |
| 2016/0104274 A1 | 4/2016 | Jovanovski et al. |
| 2016/0109219 A1 | 4/2016 | Ackley et al. |
| 2016/0109220 A1 | 4/2016 | Laffargue |
| 2016/0109224 A1 | 4/2016 | Thuries et al. |
| 2016/0112631 A1 | 4/2016 | Ackley et al. |
| 2016/0112643 A1 | 4/2016 | Laffargue et al. |
| 2016/0117627 A1 | 4/2016 | Raj et al. |
| 2016/0124516 A1 | 5/2016 | Schoon et al. |
| 2016/0125217 A1 | 5/2016 | Todeschini |
| 2016/0125342 A1 | 5/2016 | Miller et al. |
| 2016/0133253 A1 | 5/2016 | Braho et al. |
| 2016/0141809 A1 | 5/2016 | Choi |
| 2016/0171597 A1 | 6/2016 | Todeschini |
| 2016/0171666 A1 | 6/2016 | McCloskey |
| 2016/0171720 A1 | 6/2016 | Todeschini |
| 2016/0171775 A1 | 6/2016 | Todeschini et al. |
| 2016/0171777 A1 | 6/2016 | Todeschini et al. |
| 2016/0174674 A1 | 6/2016 | Oberpriller et al. |
| 2016/0178479 A1 | 6/2016 | Goldsmith |
| 2016/0178685 A1 | 6/2016 | Young et al. |
| 2016/0178707 A1 | 6/2016 | Young et al. |
| 2016/0179132 A1 | 6/2016 | Harr et al. |
| 2016/0179143 A1 | 6/2016 | Bidwell et al. |
| 2016/0179368 A1 | 6/2016 | Roeder |
| 2016/0179378 A1 | 6/2016 | Kent et al. |
| 2016/0180130 A1 | 6/2016 | Bremer |
| 2016/0180133 A1 | 6/2016 | Oberpriller et al. |
| 2016/0180136 A1 | 6/2016 | Meier et al. |
| 2016/0180594 A1 | 6/2016 | Todeschini |
| 2016/0180663 A1 | 6/2016 | McMahan et al. |
| 2016/0180678 A1 | 6/2016 | Ackley et al. |
| 2016/0180713 A1 | 6/2016 | Bernhardt et al. |
| 2016/0185136 A1 | 6/2016 | Ng et al. |
| 2016/0185291 A1 | 6/2016 | Chamberlin |
| 2016/0186926 A1 | 6/2016 | Oberpriller et al. |
| 2016/0188861 A1 | 6/2016 | Todeschini |
| 2016/0188939 A1 | 6/2016 | Sailors et al. |
| 2016/0188940 A1 | 6/2016 | Lu et al. |
| 2016/0188941 A1 | 6/2016 | Todeschini et al. |
| 2016/0188942 A1 | 6/2016 | Good et al. |
| 2016/0188943 A1 | 6/2016 | Linwood |
| 2016/0188944 A1 | 6/2016 | Wilz et al. |
| 2016/0189076 A1 | 6/2016 | Mellott et al. |
| 2016/0189087 A1 | 6/2016 | Morton et al. |
| 2016/0189088 A1 | 6/2016 | Pecorari et al. |
| 2016/0189092 A1 | 6/2016 | George et al. |
| 2016/0189284 A1 | 6/2016 | Mellott et al. |
| 2016/0189288 A1 | 6/2016 | Todeschini |
| 2016/0189366 A1 | 6/2016 | Chamberlin et al. |
| 2016/0189443 A1 | 6/2016 | Smith |
| 2016/0189447 A1 | 6/2016 | Valenzuela |
| 2016/0189489 A1 | 6/2016 | Au et al. |
| 2016/0191684 A1 | 6/2016 | DiPiazza et al. |
| 2016/0192051 A1 | 6/2016 | DiPiazza et al. |
| 2016/0125873 A1 | 7/2016 | Braho et al. |
| 2016/0202951 A1 | 7/2016 | Pike et al. |
| 2016/0202958 A1 | 7/2016 | Zabel et al. |
| 2016/0202959 A1 | 7/2016 | Doubleday et al. |
| 2016/0203021 A1 | 7/2016 | Pike et al. |
| 2016/0203429 A1 | 7/2016 | Mellott et al. |
| 2016/0203797 A1 | 7/2016 | Pike et al. |
| 2016/0203820 A1 | 7/2016 | Zabel et al. |
| 2016/0204623 A1 | 7/2016 | Haggert et al. |
| 2016/0204636 A1 | 7/2016 | Allen et al. |
| 2016/0204638 A1 | 7/2016 | Miraglia et al. |
| 2016/0316190 A1 | 7/2016 | McCloskey et al. |
| 2016/0227912 A1 | 8/2016 | Oberpriller et al. |
| 2016/0232891 A1 | 8/2016 | Pecorari |
| 2016/0259749 A1* | 9/2016 | Morrison .............. G06F 13/385 |
| 2016/0292477 A1 | 10/2016 | Bidwell |
| 2016/0294779 A1 | 10/2016 | Yeakley et al. |
| 2016/0306769 A1 | 10/2016 | Kohtz et al. |
| 2016/0314276 A1 | 10/2016 | Sewell et al. |
| 2016/0314294 A1 | 10/2016 | Kubler et al. |
| 2016/0323310 A1 | 11/2016 | Todeschini et al. |
| 2016/0325677 A1 | 11/2016 | Fitch et al. |
| 2016/0327614 A1 | 11/2016 | Young et al. |
| 2016/0327930 A1 | 11/2016 | Charpentier et al. |
| 2016/0328762 A1 | 11/2016 | Pape |
| 2016/0330218 A1 | 11/2016 | Hussey et al. |
| 2016/0343163 A1 | 11/2016 | Venkatesha et al. |
| 2016/0343176 A1 | 11/2016 | Ackley |
| 2016/0364914 A1 | 12/2016 | Todeschini |
| 2016/0370220 A1 | 12/2016 | Ackley et al. |
| 2016/0372282 A1 | 12/2016 | Bandringa |
| 2016/0373847 A1 | 12/2016 | Vargo et al. |
| 2016/0377414 A1 | 12/2016 | Thuries et al. |
| 2016/0377417 A1 | 12/2016 | Jovanovski et al. |
| 2017/0010141 A1 | 1/2017 | Ackley |
| 2017/0010328 A1 | 1/2017 | Mullen et al. |
| 2017/0010780 A1 | 1/2017 | Waldron et al. |
| 2017/0016714 A1 | 1/2017 | Laffargue et al. |
| 2017/0018094 A1 | 1/2017 | Todeschini |
| 2017/0046603 A1 | 2/2017 | Lee et al. |
| 2017/0047864 A1 | 2/2017 | Stang et al. |
| 2017/0053146 A1 | 2/2017 | Liu et al. |
| 2017/0053147 A1 | 2/2017 | Geramine et al. |
| 2017/0053647 A1 | 2/2017 | Nichols et al. |
| 2017/0055606 A1 | 3/2017 | Xu et al. |
| 2017/0060316 A1 | 3/2017 | Larson |
| 2017/0061961 A1 | 3/2017 | Nichols et al. |
| 2017/0064634 A1 | 3/2017 | Van Horn et al. |
| 2017/0083730 A1 | 3/2017 | Feng et al. |
| 2017/0091502 A1 | 3/2017 | Furlong et al. |
| 2017/0091706 A1 | 3/2017 | Lloyd et al. |
| 2017/0091741 A1 | 3/2017 | Todeschini |
| 2017/0091904 A1 | 3/2017 | Ventress |
| 2017/0092908 A1 | 3/2017 | Chaney |
| 2017/0094238 A1 | 3/2017 | Germaine et al. |
| 2017/0098947 A1 | 4/2017 | Wolski |
| 2017/0100949 A1 | 4/2017 | Celinder et al. |
| 2017/0108838 A1 | 4/2017 | Todeschinie et al. |
| 2017/0108895 A1 | 4/2017 | Chamberlin et al. |
| 2017/0118355 A1 | 4/2017 | Wong et al. |
| 2017/0123598 A1 | 5/2017 | Phan et al. |
| 2017/0124369 A1 | 5/2017 | Rueblinger et al. |
| 2017/0124396 A1 | 5/2017 | Todeschini et al. |
| 2017/0124687 A1 | 5/2017 | McCloskey et al. |
| 2017/0126873 A1 | 5/2017 | McGary et al. |
| 2017/0126904 A1 | 5/2017 | d'Armancourt et al. |
| 2017/0139012 A1 | 5/2017 | Smith |
| 2017/0140329 A1 | 5/2017 | Bernhardt et al. |
| 2017/0140731 A1 | 5/2017 | Smith |
| 2017/0147847 A1 | 5/2017 | Berggren et al. |
| 2017/0150124 A1 | 5/2017 | Thuries |
| 2017/0169198 A1 | 6/2017 | Nichols |
| 2017/0171035 A1 | 6/2017 | Lu et al. |
| 2017/0171703 A1 | 6/2017 | Maheswaranathan |
| 2017/0171803 A1 | 6/2017 | Maheswaranathan |
| 2017/0180359 A1 | 6/2017 | Wolski et al. |
| 2017/0180577 A1 | 6/2017 | Nguon et al. |
| 2017/0181299 A1 | 6/2017 | Shi et al. |
| 2017/0190192 A1 | 7/2017 | Delario et al. |
| 2017/0193432 A1 | 7/2017 | Bernhardt |
| 2017/0193461 A1 | 7/2017 | Jonas et al. |

(56) References Cited

U.S. PATENT DOCUMENTS

| | | |
|---|---|---|
| 2017/0193727 A1 | 7/2017 | Van Horn et al. |
| 2017/0200108 A1 | 7/2017 | Au et al. |
| 2017/0200275 A1 | 7/2017 | McCloskey et al. |
| 2017/0219623 A1* | 8/2017 | Choi .................. G01R 1/07314 |
| 2018/0293857 A1* | 10/2018 | Berglund ........... G08B 13/1445 |

* cited by examiner

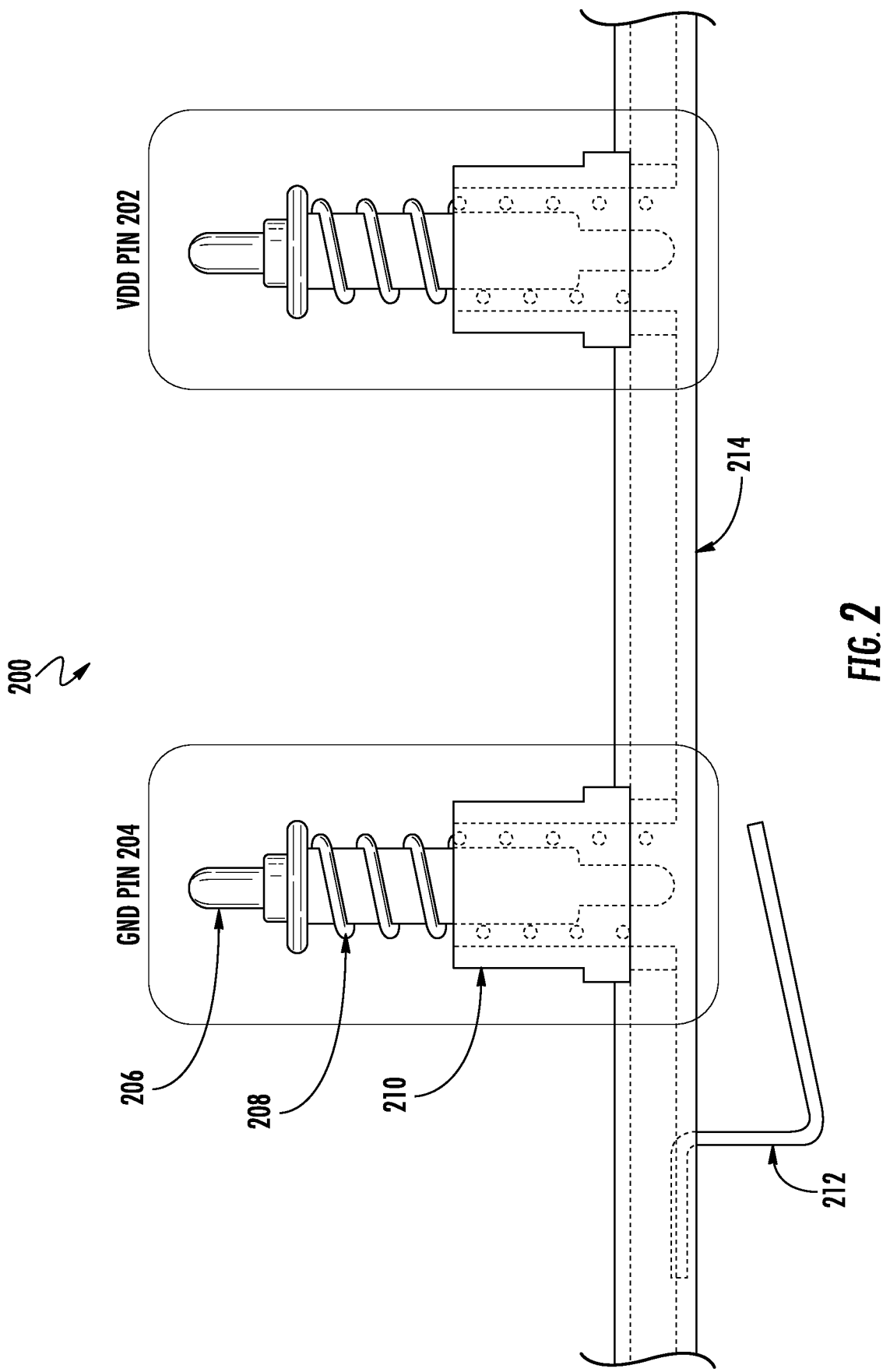

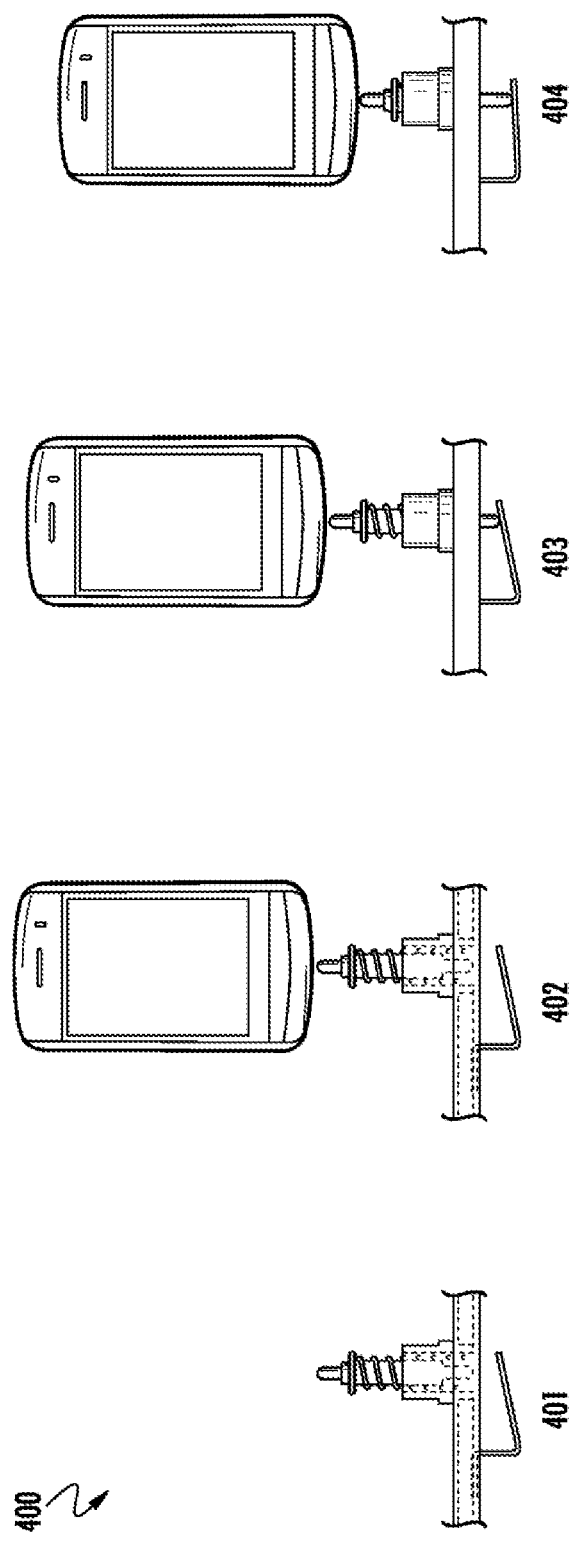

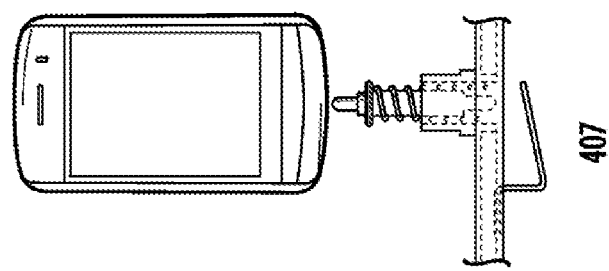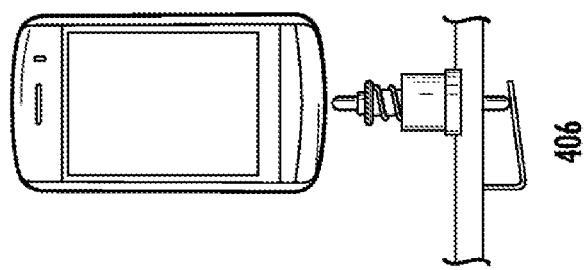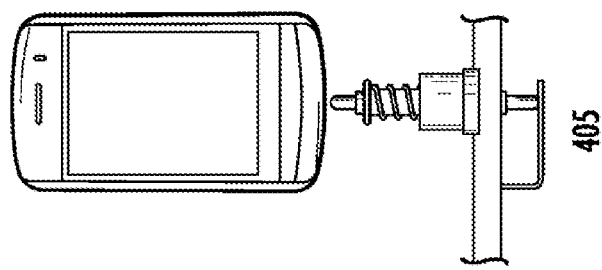
FIG. 4B

POGO CONNECTOR BASED SOFT POWER START SOLUTION

CROSS-REFERENCE TO RELATED APPLICATION

The present application claims the benefit of Chinese Patent Application for Invention No. 201710685370.7 for a POGO CONNECTOR BASED SOFT POWER START SOLUTION filed Aug. 11, 2017, which is hereby incorporated by reference in its entirety.

FIELD OF THE INVENTION

The present invention relates to charging methods for mobile terminals or similar apparatuses. More particularly, the present invention relates to soft power start solutions based on two pin POGO connectors.

BACKGROUND

Generally speaking, traditional charging cradle's power is always turned on at the docking connector. If a mobile terminal is docked into a charging cradle, the power of the charging cradle may burn the contact interface by an electrical arc at the moment of contact.

Traditional soft power start solutions may be implemented to ensure that no power is applied on the contact interface at the moment of contact. These solutions may need three contact points, e.g., VDD, GND, and DETECT between the terminal and charging cradle.

Therefore, a need exists for a soft power start solution based on a two pin connector, such as a two pin POGO connector.

SUMMARY

Accordingly, in one aspect, the present invention embraces systems and methods for a soft power start solution based on a two pin connector for a device such as a mobile terminal. When a charging pad of the device is first docked to a charging cradle, the charging pad of the device is connected to a plunger in a ground pin, but power is not applied at that moment. In a separate step, the plunger is shorted to a spring flat that allows power to be applied to the charging pad. Similar steps occur during de-docketing. With this method, contact interface burn caused by electrical arcing when docking or de-docking a mobile terminal from a charging cradle may be minimized.

In an exemplary embodiment, a soft power start solution comprises a mobile terminal comprises a charging pad; a charging cradle comprising a two pin POGO connector, a spring flat, and a printed circuit board. The two pin POGO connector comprises a GND pin and a VDD pin, with the GND pin and the VDD pin each comprising a plunger, a coil spring and a barrel. The spring flat enables or disables power applied to the charging pad. The soft start solution also includes the printed circuit board with through holes, wherein the barrels of the two pin POGO connector are soldered around the through holes on one side of the printed circuit board, such that the pins can pass through the through holes, and the spring flat soldered on an opposite side of the printed circuit board in proximity to a through hole associated with the GND pin. The soft start solution also comprises a power block that is coupled to the spring flat.

If the mobile terminal is docked to the charging cradle, the charging pad is connected to at least the two pin POGO connector. If a separate force caused by the mobile terminal is applied to the plunger of the GND pin, the GND pin is in contact with the spring flat causing the mobile terminal to begin charging.

The coil spring generates a pressure that prevents the plunger of the GND pin from extending out of the barrel on the opposite side of the printed circuit board, unless the separate force caused by the mobile terminal is applied to the plunger of the GND pin. If the separate force caused by the mobile terminal is applied to the plunger of the GND pin, the separate force overcomes the pressure of the coil spring and causes the plunger of the GND pin to extend out of the barrel of the GND pin. If the mobile terminal is not docked to the charging cradle, the plunger of the GND pin is not connected to the spring flat. If the charging pad is connected to the GND pin before connecting the spring flat to the GND pin, an occurrence of electrical arcing at the charging pad of the mobile terminal is minimized.

In another exemplary embodiment, a charging cradle comprises a two pin connector, which further comprises a GND pin and a VDD pin, with the GND pin and the VDD pin each comprising a plunger, a coil spring and a barrel; and a spring flat capable of enabling or disabling power to the charging cradle by connecting to a power block; and a printed circuit board with the two pin connector located on one side of the printed circuit board, and the spring flat located on an opposite side of the printed circuit board. After the plunger of the GND pin connects with a device, a force is then applied to the plunger of the GND pin causing the plunger of the GND pin to extend through a hole of the printed circuit board and causing the GND pin to be connected with the spring flat. Power is then applied to the GND pin to charge the device. The power block is coupled to the spring flat to provide power. The device may be a mobile terminal. If the plunger of the GND pin is not connected to the spring flat, the power is not applied to the device. If the device is docked with the charging cradle, the plunger of the GND pin extends to the opposite side of the printed circuit board, causing a connection with the spring flat.

In yet another exemplary embodiment, a method for a soft power start solution for a mobile terminal comprising the steps of: i) constructing a charging cradle with a two pin connector, a spring flat and a printed circuit board; ii) positioning the two pin connector on one side of the printed circuit board, wherein the two pin connector comprises a GND pin and a VDD pin with the GND pin and the VDD pin each comprising a plunger, a coil spring and a barrel; iii) positioning the spring flat on an opposite side of the printed circuit board in proximity to the GND pin, wherein the spring flat is coupled to a power block; and iv) charging the mobile terminal based on a docketing status of the mobile terminal and the charging cradle. By connecting a charging pad of the mobile terminal to the GND pin before connecting the spring flat to the GND pin, an occurrence of electrical arcing at the charging pad of the mobile terminal is minimized.

The method further comprises the step of not docking the mobile terminal with the charging cradle. Since the spring flat is not connected with the GND pin, the power block is not active, and power is not applied to the two pin connector. The method further comprises the step of initially docking the mobile terminal with the charging cradle, causing the plunger of the GND pin to contact with the charging pad of the mobile terminal. Since the plunger of the GND pin does not extend to cause the spring flat to short with the GND pin, the power block is not active, and power is not applied to the two pin connector.

The method further comprises the steps of: i) docking the mobile terminal with the charging cradle; and ii) pressing the plunger of the GND pin to extend to the opposite side of the printed circuit board to allow the GND pin to be connected to the spring flat. Since the power block is active and power is applied to the two pin connector of the charging cradle, the charging cradle begins to charge the mobile terminal.

The method further comprises the step of further pressing the plunger of the GND pin to extend the plunger of the GND pin a maximum distance on the other side of the printed circuit board. Since the spring flat remains shorted with the GND pin, the power block remains active, and power from the two pin connector of the charging cradle continues to be applied to the mobile terminal. If the spring flat vibrates, the mobile terminal continues to charge the mobile terminal The method further comprises the step of removing the mobile terminal from the charging cradle, causing a disconnect of the plunger of the GND pin with the spring flat. Since the spring flat is not connected with the GND pin, the power block is not active, and the charging cradle stops charging the mobile terminal. The charging pad of the mobile terminal and the two pin connector remain connected during removal of the mobile terminal from the charging cradle.

The method further comprises the step of removing the mobile terminal from the charging cradle, causing the plunger of a ground pin to disconnect with charging pad of the mobile terminal. Since the spring flat is not connected with GND pin earlier than the plunger of a ground pin to disconnect with the charging pad of the mobile terminal, the power block is not active, and there is no power applied to the two pin connector during removal of the device from the charging cradle.

The barrels of two pin connector are soldered around through holes on the one side of the printed circuit board. A pressure of the coil spring prevents the plunger of the GND pin from extending out of its barrel on the opposite side of the printed circuit board. If a force is applied to the plunger of the GND pin, the plunger of the GND pin extends through a hole in the printed circuit board and is connected to the spring flat causing the GND pin to be coupled to the power block.

The foregoing illustrative summary, as well as other exemplary objectives and/or advantages of the invention, and the manner in which the same are accomplished, are further explained within the following detailed description and its accompanying drawings.

BRIEF DESCRIPTION OF THE DRAWINGS

FIG. 2 illustrates an exemplary embodiment of a two pin POGO connector installed on a printed circuited board.

FIG. 4A illustrates several exemplary embodiments of charging conditions for the soft based power start charging solution based on two POGP pins.

FIG. 4B illustrates several other exemplary embodiments of charging conditions for the soft based power start charging solution based on two POGP pins.

DETAILED DESCRIPTION

The present invention embraces charging methods for mobile terminals or similar apparatuses, and more specifically relates to a soft power start solution based on 2 pin connectors such as a POGO two pin connector.

For 2 Pin connector charging cradles (such as iPod 5 Homebase, Quad-charging base), traditional charging cradle's power is always on to the docking connector. When a mobile terminal docks into a charging cradle, the power of the charging cradle may burn the contact interface by an electrical arc during the moment of contact. Some customer complaints include the ipod5/iPhone5 Sled's Charging Flat being burned after a long time period of docking with the charging cradle.

For many of Honeywell's Enterprise Mobile terminals (such as D75e, CT50, iPhone 6 Sled), a traditional soft power start solution may be implemented to ensure there is minimal or no power on the contact interface at the moment of contact. In this case, the power at the contact interface may be enabled after terminal docking, and then there is no electrical arc burns in the moment of docking. Therefore, the reliability of the contact interface is good.

But the traditional soft power start solutions (for example: D75e, CT50, iPhone 6 Sled) may need at least 3 contact points such as VDD, GND, and DETECT between terminal and charging cradle. For the other mobile terminal (such as EDA50, TAIS), a charging contact interface has to be designed with 2 contact points due to ID, Cost, Antenna performance impact. Thus, there is need for a soft power start solution based on a two pin connector, such as a two pin POGO connector.

Figure 1:
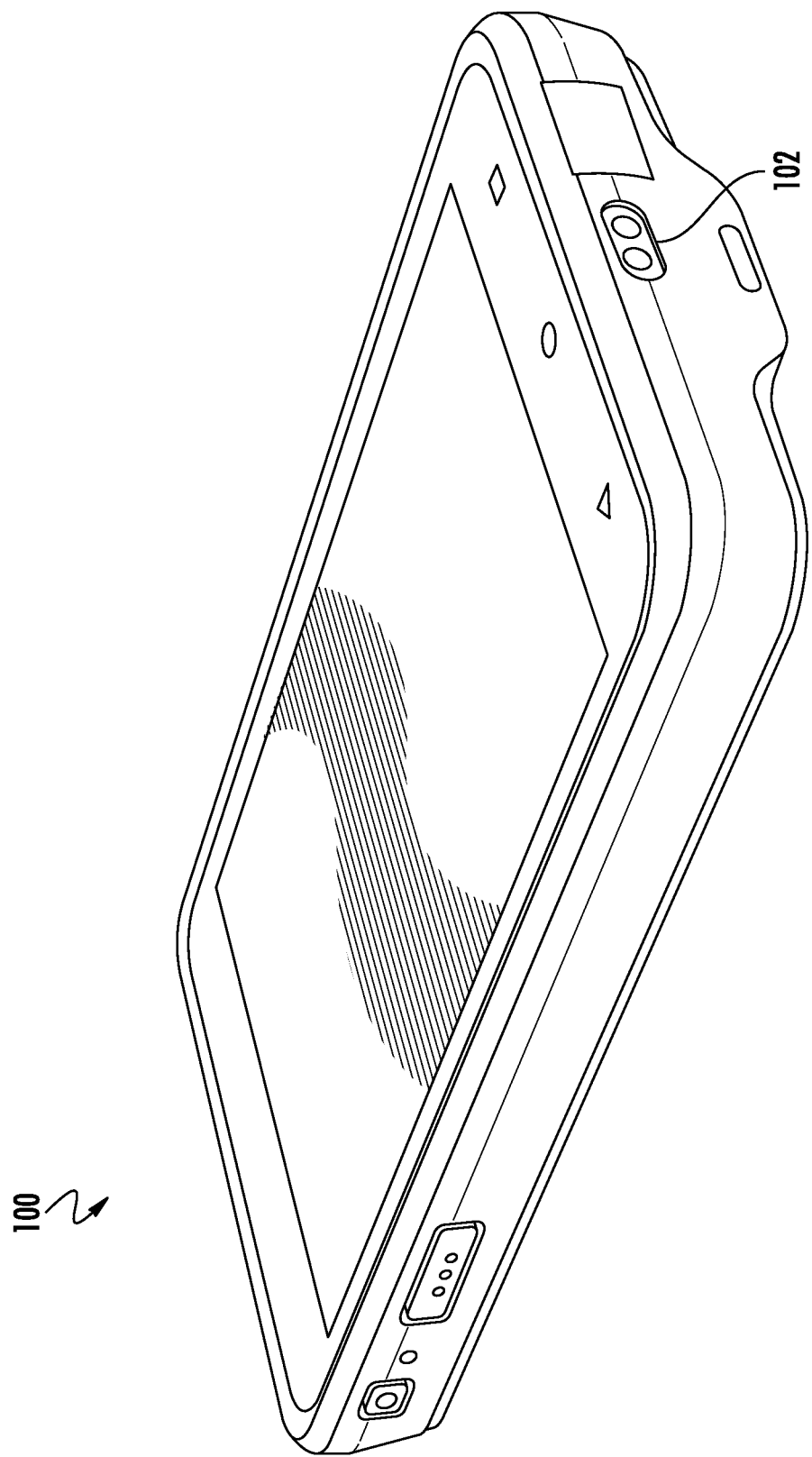
FIG. 1 illustrates an embodiment of a mobile terminal charging pad of a mobile terminal.

FIG. 1 illustrates an embodiment of a mobile terminal 100 with a mobile terminal charging pad 102. Mobile terminal charging pad 102 has two pins.

FIG. 2 illustrates an exemplary embodiment 200 of a two pin POGO connector and spring flat 212 installed on a printed circuited board (PCB) 214. The two pin POGO connector comprises GND pin 204 and VDD pin 202. GND pin 204 further comprises plunger 206, coil spring 208, and barrel 210.

Figure 3A:
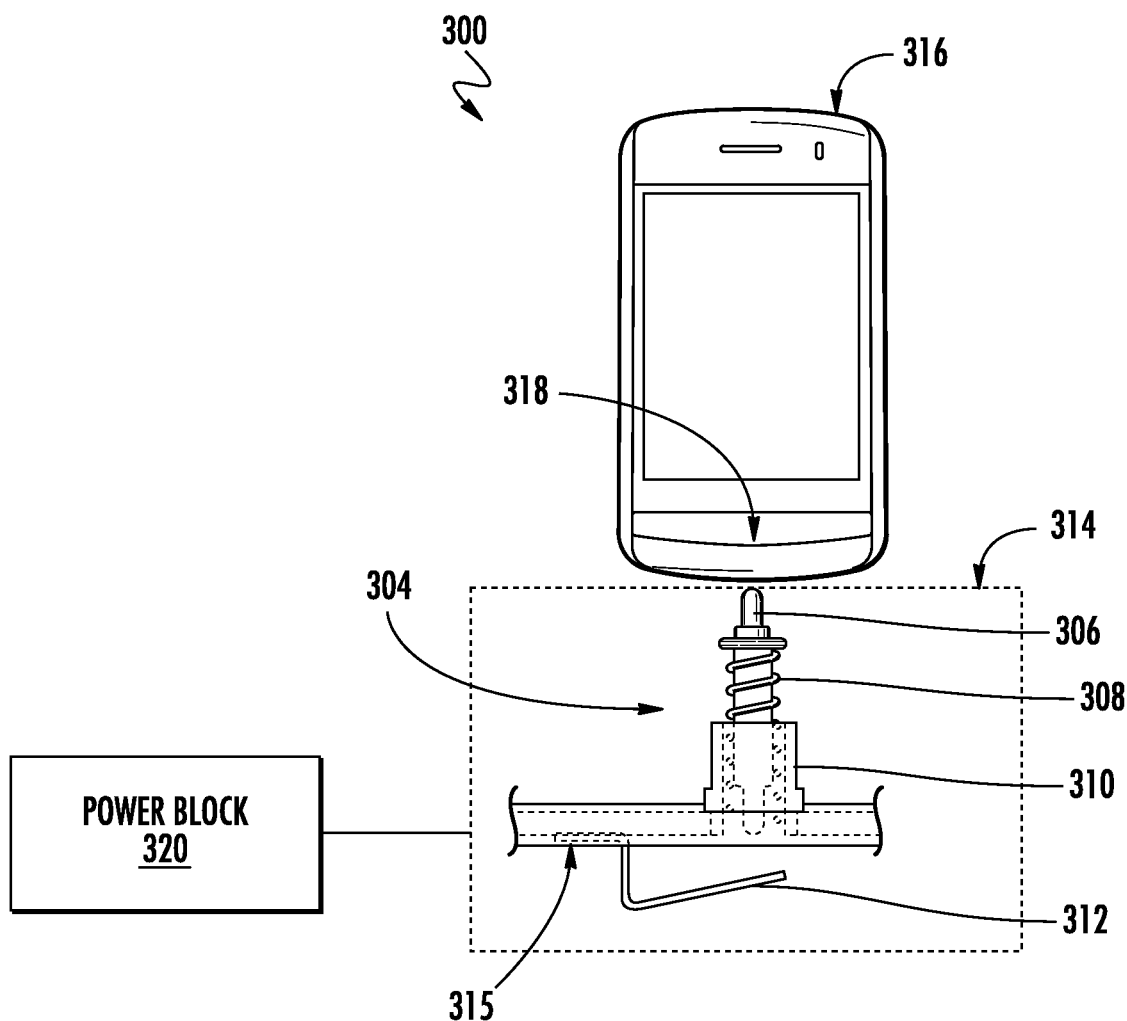
FIG. 3A illustrates an exemplary embodiment of a system for a soft based power start charging solution.

The PCB 214 with barrels of two pin POGO connector that may be soldered around through holes on one side of a printed circuit board. The spring flat may be soldered on another side of the printed circuit board in proximity to a through hole associated with the GND pin;

FIG. 3A illustrates an exemplary embodiment of a system 300 for a soft based power start charging solution. The solution includes a charging cradle 314, which comprises VDD pin 302 (not shown), GND pin 304 and its associated plunger 306, coil spring 308, barrel 310, spring flat 312. Coupled to the spring flat 312 via the printed circuit board is power block 320. Mobile terminal 316 comprises a charging pad 318.

The charging cradle 314 with a 2 Pin POGO connector, may be designed with a customized GND pin 304 of the 2 Pin POGO connector: 1) plunger 306 may not extend out barrel 310 from one side (top side) to the other side (bottom side) due to the pressure caused by coil spring 308; 2) plunger 306 may extend out barrel 310 to the other side (bottom side) when plunger 306 is pressed by charging pad 318. The 2 Pin POGO connector barrels may be soldered around the through holes of PCB 315 and the spring flat 312 on the other side of PCB 315.

In operations: 1) plunger 306 may not short to spring flat 312 without pressure. This may be the situation when mobile terminal 316 is not docked into charging cradle 314; 2) Plunger 306 may short to the spring flat 312 if plunger 306 is pressed from the top side. This may be the situation when mobile terminal 316 is docked into charging cradle 314. The spring flat 312 may be used to enable or disable the power (in an active low mode) in charging cradle 314.

Specifically, 1) when mobile terminal 316 is not docked into charging cradle 314, spring flat 312 is not shorted to ground. Power block 320 is open because the voltage on spring flat is pulled high causing no power to be applied to the two pin Pogo connector of the charging cradle 314: 2) when mobile terminal 316 is docked into charging cradle 314, spring flat 312 is shorted to ground and power block 320 is active because spring flat 312 is shorted to ground (i.e., a low voltage). In this case, power is applied to the two pin Pogo connector of the charging cradle 314.

Figure 3B:
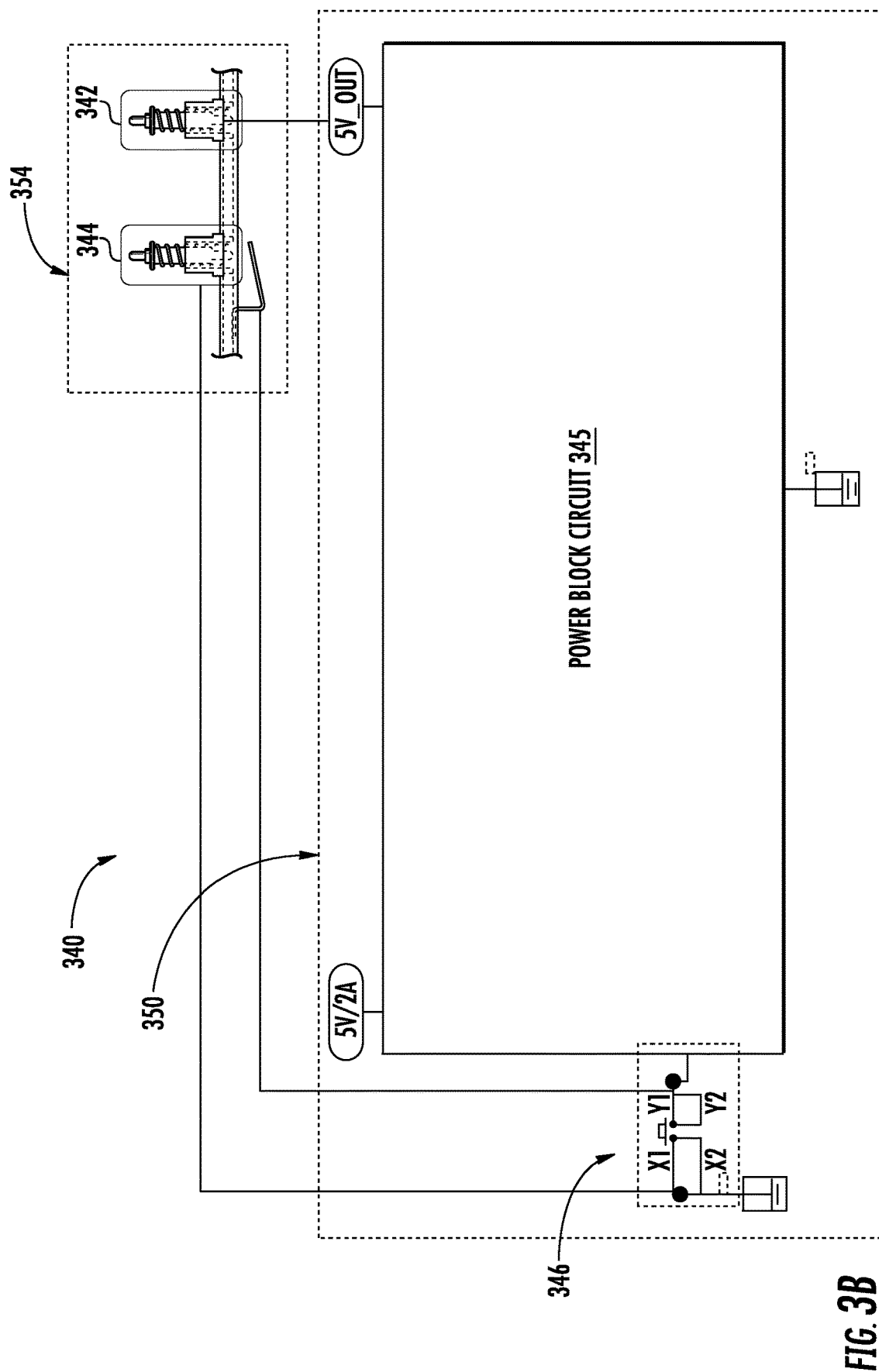
FIG. 3B illustrates an exemplary embodiment of a power block of a charging cradle coupled to a two pin POGO connector.

In an exemplary embodiment 340, FIG. 3B illustrates a power block 350 with charging cradle 354 that is coupled to a two pin POGO connector. Charging cradle 354 comprises GND pin 344 and VDD pin 342. Power block 350 comprises power block circuit 345 and PoGo pin switch 346.

When mobile terminal 316 is pressed on the two pin PoGo connector, a DET signal may result. This means that when mobile terminal 316 presses on GND pin 304, plunger 306 is shorted to spring flat 312 causing spring flat 312 to be pulled low since PoGo pin switch 346 is active (X1 is coupled to Y1 in PoGo pin switch 346). (References to elements of FIG. 3A and FIG. 3B)

FIGS. 4A and 4B illustrates several exemplary embodiments (embodiment 400 and embodiment 420) of charging conditions for the soft power start charging solution based on a two POGO pin connector. In the following paragraphs, references are made to elements of FIG. 3A, which illustrates of a system for a soft based power start charging solution.

The solution is customized by soldering, on one side (top side) of the 2 Pin POGO connector, barrel 310 around a through hole of PCB 315. Then a spring flat 312 may be soldered on the other side (bottom side) of PCB 315. The plunger 306 of GND Pin 304 of the two pin POGO connector may extend out from bottom side of PCB 315 and shorted to spring flat 312, if the plunger 306 is pressed from top side. Spring flat 312 may connect to a low voltage activated power block 320, and spring flat 312 is pulled up to high voltage by a resistor in the power block 320.

Condition 1 401: When a mobile terminal 316 is not docked into a charging cradle, the spring flat 312 is not shorted with GND, the power block 320 is not active, and no power is applied on the POGO connector of the charging cradle 314;

Condition 2 402: When the mobile terminal 316 is docked into the charging cradle 314, the plunger 306 contacts the mobile terminal's charging pad 318. At this moment: the plunger 306 of the GND pin 304 is not extended out of the back side. Therefore, the spring flat is not shorted with the GND pin 304, the power block 320 is not active, and no power is applied on the POGO connector of the charging cradle. So, there is no or minimal electrical arc between the charging cradle's POGO Connector and the mobile terminal's charging pad.

Condition 3 403: When the mobile terminal 316 is docked into the charging cradle 314, the plunger 306 of the GND pin 304 extends out of the back side and then is shorted to the spring flat 312. At this moment: the spring flat 312 is shorted with the GND pin 304, the power block 320 is active, and power on the POGO connector of the charging cradle 314 begins to power the mobile terminal 316. Due to the charging cradle's POGO connector and the mobile terminal's charging pad 318 already being shorted, there is no or minimal electrical arc at the charging pad 318 at this moment.

Condition 4 404: When the mobile terminal 316 is docked into the charging cradle 314 by a maximum amount, the plunger 306 of the GND pin 304 is kept shorted to the spring flat 312. At this moment: the spring flat 312 is still shorted with the GND pin 304, the power block 320 is still active, and power on the POGO connector of the charging cradle 314 keeps power to the mobile terminal 316. Due to the charging cradle's POGO connector and the mobile terminal's charging pad 318 being already shorted, there is no or minimal electrical arc at the charging pad 318 at this moment.

Condition 5 405: When the mobile terminal 316 varies in the charging cradle 314 between "condition 3" and "condition 4" due to vibrations, the plunger 306 of the GND pin 304 is kept short to the spring flat 312. For this condition: the spring flat 312 is still shorted with the GND pin 304, the power block 320 is still active, and power on the POGO connector of the charging cradle 314 keeps power to the mobile terminal 316. Due to the charging cradle's POGO connector and the mobile terminal's charging pad 318 being kept short, there is no electrical arc at the charging pad 318 at this moment.

Condition 6 406: When the mobile terminal 316 is removed from the charging cradle 314, the plunger 306 of the GND pin 304 is kept open from the spring flat 312. At this moment: the spring flat 312 is not shorted with the GND pin 304, the power block 320 is not active, and the charging cradle 314 stops applying power to the mobile terminal 316. Due to the charging cradle's POGO connector and the mobile terminal's charging pad 318 being kept shorted, there is no electrical arc at the charging pad 318 at this moment.

Condition 7 407: When the mobile terminal 316 is removed from the charging cradle 314, the plunger 306 of the POGO connector disconnects with the mobile terminal's charging pad 318. At this moment: the spring flat 312 is still not shorted with GND, the power block 320 is not kept active, and there is no power on the POGO connector of the charging cradle 314. So, there is no electrical arc at this moment even with the charging cradle's POGO connector disconnecting from the mobile terminal's charging pad 318.

If charging pad 318 is connected to GND pin 304 before shorting spring flat 312 to GND pin 304, an occurrence of electrical arcing at charging pad 318 of mobile terminal 316 is minimized. In this case, the electrical resistance between spring flat 312 and plunger 306 of GND pin 304 increases by no more than 10%.

Figure 5:
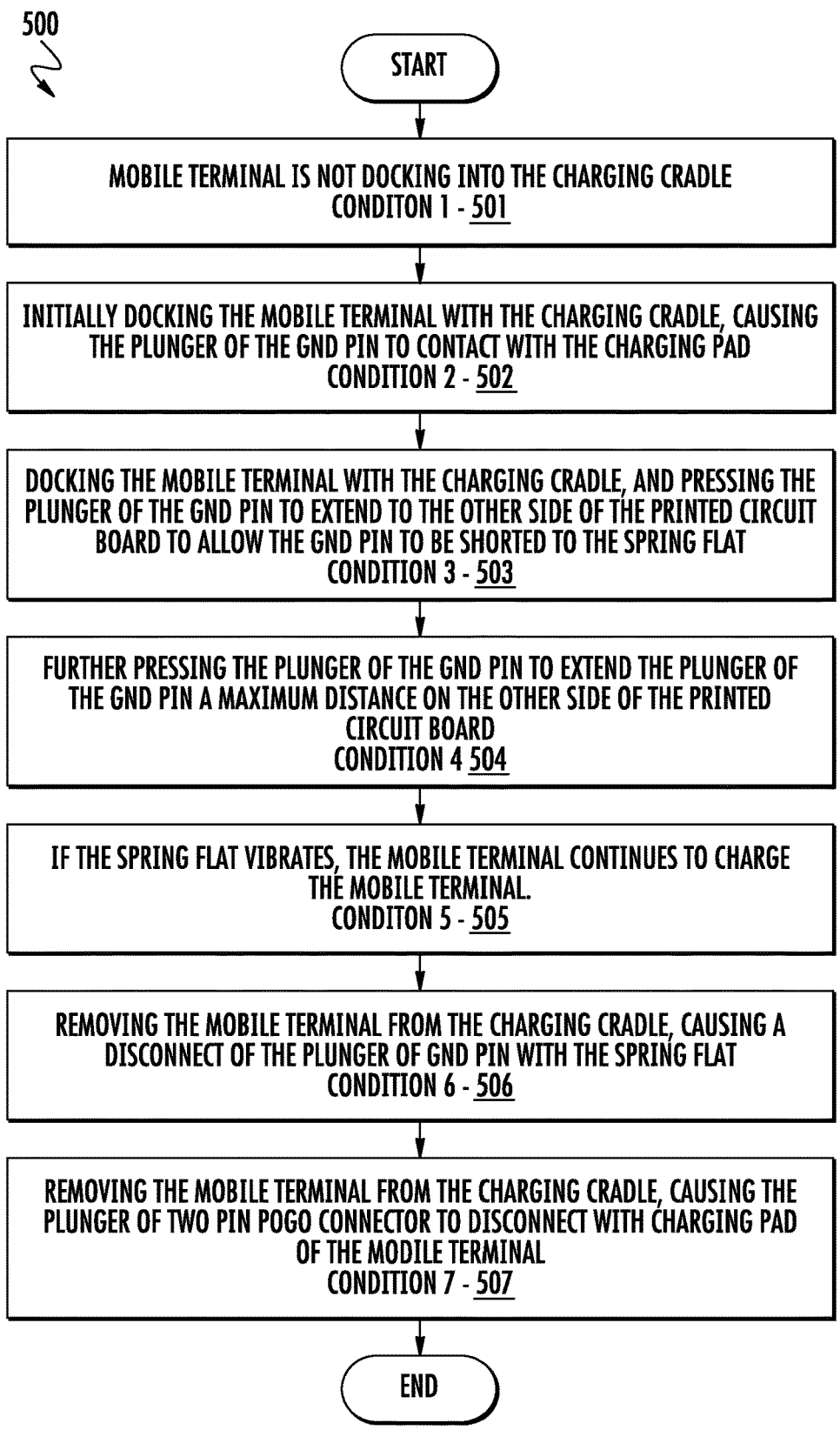
FIG. 5 illustrates an exemplary embodiment of a flowchart depicting the steps to charge a mobile terminal using a soft power start charging solution based on two POGP pins.

If spring flat 312 vibrates, mobile terminal 316 continues to charge mobile terminal 316 so long as spring flat 312 maintains a contact with plunger 306 of GND pin 304. Typically, the extended potion of spring flat 312 may vibrate no more than 10 degrees from its original position FIG. 5 illustrates an exemplary embodiment of a flowchart 500 depicting the steps to charge a mobile terminal using a soft power start charging solution based on two POGP pins. Flowchart 500 includes conditions 1-7 that were previously illustrated in FIG. 4A and FIG. 4B. The steps described below include references to components in FIG. 3A. The steps include:

Condition 1: Mobile terminal 316 is not docking into the charging cradle 314 (step 501)

Condition 2: Initially docking the mobile terminal 316 with the charging cradle 314, causing the plunger 306 of the GND pin 304 to contact with the charging pad 318. (step 502)

Condition 3: Docking the mobile terminal 316 with the charging cradle 314, and pressing plunger 306 of the GND pin 304 to extend to the other side of the printed circuit board 315 to allow the GND pin 304 to be shorted to the spring flat 312. (step 503)

Condition 4: Further pressing the plunger 306 of the GND pin 304 to extend the plunger 306 of the GND pin 304 a maximum distance on the other side of the printed circuit board. (step 504)

Condition 5: If the spring flat 312 vibrates, the mobile terminal 316 continues to charge the mobile terminal 316. (step 505)

Condition 6: Removing the mobile terminal 316 from the charging cradle 314, causing a disconnect of the plunger 306 of GND pin 304 with the spring flat 312 (step 505)

Condition 7: Removing the mobile terminal 316 from the charging cradle 314, causing the plunger 306 of two pin POGO connector to disconnect with charging pad 318 of the mobile terminal 316. This means the plunger 306 is disconnected from GRN pin. (step 507)

To supplement the present disclosure, this application incorporates entirely by reference the following commonly assigned patents, patent application publications, and patent applications:

U.S. Pat. Nos. 6,832,725; 7,128,266;
U.S. Pat. Nos. 7,159,783; 7,413,127;
U.S. Pat. Nos. 7,726,575; 8,294,969;
U.S. Pat. Nos. 8,317,105; 8,322,622;
U.S. Pat. Nos. 8,366,005; 8,371,507;
U.S. Pat. Nos. 8,376,233; 8,381,979;
U.S. Pat. Nos. 8,390,909; 8,408,464;
U.S. Pat. Nos. 8,408,468; 8,408,469;
U.S. Pat. Nos. 8,424,768; 8,448,863;
U.S. Pat. Nos. 8,457,013; 8,459,557;
U.S. Pat. Nos. 8,469,272; 8,474,712;
U.S. Pat. Nos. 8,479,992; 8,490,877;
U.S. Pat. Nos. 8,517,271; 8,523,076;
U.S. Pat. Nos. 8,528,818; 8,544,737;
U.S. Pat. Nos. 8,548,242; 8,548,420;
U.S. Pat. Nos. 8,550,335; 8,550,354;
U.S. Pat. Nos. 8,550,357; 8,556,174;
U.S. Pat. Nos. 8,556,176; 8,556,177;
U.S. Pat. Nos. 8,559,767; 8,599,957;
U.S. Pat. Nos. 8,561,895; 8,561,903;
U.S. Pat. Nos. 8,561,905; 8,565,107;
U.S. Pat. Nos. 8,571,307; 8,579,200;
U.S. Pat. Nos. 8,583,924; 8,584,945;
U.S. Pat. Nos. 8,587,595; 8,587,697;
U.S. Pat. Nos. 8,588,869; 8,590,789;
U.S. Pat. Nos. 8,596,539; 8,596,542;
U.S. Pat. Nos. 8,596,543; 8,599,271;
U.S. Pat. Nos. 8,599,957; 8,600,158;
U.S. Pat. Nos. 8,600,167; 8,602,309;
U.S. Pat. Nos. 8,608,053; 8,608,071;
U.S. Pat. Nos. 8,611,309; 8,615,487;
U.S. Pat. Nos. 8,616,454; 8,621,123;
U.S. Pat. Nos. 8,622,303; 8,628,013;
U.S. Pat. Nos. 8,628,015; 8,628,016;
U.S. Pat. Nos. 8,629,926; 8,630,491;
U.S. Pat. Nos. 8,635,309; 8,636,200;
U.S. Pat. Nos. 8,636,212; 8,636,215;
U.S. Pat. Nos. 8,636,224; 8,638,806;
U.S. Pat. Nos. 8,640,958; 8,640,960;
U.S. Pat. Nos. 8,643,717; 8,646,692;
U.S. Pat. Nos. 8,646,694; 8,657,200;
U.S. Pat. Nos. 8,659,397; 8,668,149;
U.S. Pat. Nos. 8,678,285; 8,678,286;
U.S. Pat. Nos. 8,682,077; 8,687,282;
U.S. Pat. Nos. 8,692,927; 8,695,880;
U.S. Pat. Nos. 8,698,949; 8,717,494;
U.S. Pat. Nos. 8,717,494; 8,720,783;
U.S. Pat. Nos. 8,723,804; 8,723,904;
U.S. Pat. Nos. 8,727,223; 8,740,082;
U.S. Pat. Nos. 8,740,085; 8,746,563;
U.S. Pat. Nos. 8,750,445; 8,752,766;
U.S. Pat. Nos. 8,756,059; 8,757,495;
U.S. Pat. Nos. 8,760,563; 8,763,909;
U.S. Pat. Nos. 8,777,108; 8,777,109;
U.S. Pat. Nos. 8,779,898; 8,781,520;
U.S. Pat. Nos. 8,783,573; 8,789,757;
U.S. Pat. Nos. 8,789,758; 8,789,759;
U.S. Pat. Nos. 8,794,520; 8,794,522;
U.S. Pat. Nos. 8,794,525; 8,794,526;
U.S. Pat. Nos. 8,798,367; 8,807,431;
U.S. Pat. Nos. 8,807,432; 8,820,630;
U.S. Pat. Nos. 8,822,848; 8,824,692;
U.S. Pat. Nos. 8,824,696; 8,842,849;
U.S. Pat. Nos. 8,844,822; 8,844,823;
U.S. Pat. Nos. 8,849,019; 8,851,383;
U.S. Pat. Nos. 8,854,633; 8,866,963;
U.S. Pat. Nos. 8,868,421; 8,868,519;
U.S. Pat. Nos. 8,868,802; 8,868,803;
U.S. Pat. Nos. 8,870,074; 8,879,639;
U.S. Pat. Nos. 8,880,426; 8,881,983;
U.S. Pat. Nos. 8,881,987; 8,903,172;
U.S. Pat. Nos. 8,908,995; 8,910,870;
U.S. Pat. Nos. 8,910,875; 8,914,290;
U.S. Pat. Nos. 8,914,788; 8,915,439;
U.S. Pat. Nos. 8,915,444; 8,916,789;
U.S. Pat. Nos. 8,918,250; 8,918,564;
U.S. Pat. Nos. 8,925,818; 8,939,374;
U.S. Pat. Nos. 8,942,480; 8,944,313;
U.S. Pat. Nos. 8,944,327; 8,944,332;
U.S. Pat. Nos. 8,950,678; 8,967,468;
U.S. Pat. Nos. 8,971,346; 8,976,030;
U.S. Pat. Nos. 8,976,368; 8,978,981;
U.S. Pat. Nos. 8,978,983; 8,978,984;
U.S. Pat. Nos. 8,985,456; 8,985,457;
U.S. Pat. Nos. 8,985,459; 8,985,461;
U.S. Pat. Nos. 8,988,578; 8,988,590;
U.S. Pat. Nos. 8,991,704; 8,996,194;
U.S. Pat. Nos. 8,996,384; 9,002,641;
U.S. Pat. Nos. 9,007,368; 9,010,641;
U.S. Pat. Nos. 9,015,513; 9,016,576;
U.S. Pat. Nos. 9,022,288; 9,030,964;
U.S. Pat. Nos. 9,033,240; 9,033,242;
U.S. Pat. Nos. 9,036,054; 9,037,344;
U.S. Pat. Nos. 9,038,911; 9,038,915;
U.S. Pat. Nos. 9,047,098; 9,047,359;
U.S. Pat. Nos. 9,047,420; 9,047,525;
U.S. Pat. Nos. 9,047,531; 9,053,055;
U.S. Pat. Nos. 9,053,378; 9,053,380;
U.S. Pat. Nos. 9,058,526; 9,064,165;
U.S. Pat. Nos. 9,064,165; 9,064,167;
U.S. Pat. Nos. 9,064,168; 9,064,254;
U.S. Pat. Nos. 9,066,032; 9,070,032;
U.S. Pat. Nos. 9,076,459; 9,079,423;
U.S. Pat. Nos. 9,080,856; 9,082,023;

U.S. Pat. Nos. 9,082,031; 9,084,032;
U.S. Pat. Nos. 9,087,250; 9,092,681;
U.S. Pat. Nos. 9,092,682; 9,092,683;
U.S. Pat. Nos. 9,093,141; 9,098,763;
U.S. Pat. Nos. 9,104,929; 9,104,934;
U.S. Pat. Nos. 9,107,484; 9,111,159;
U.S. Pat. Nos. 9,111,166; 9,135,483;
U.S. Pat. Nos. 9,137,009; 9,141,839;
U.S. Pat. Nos. 9,147,096; 9,148,474;
U.S. Pat. Nos. 9,158,000; 9,158,340;
U.S. Pat. Nos. 9,158,953; 9,159,059;
U.S. Pat. Nos. 9,165,174; 9,171,543;
U.S. Pat. Nos. 9,183,425; 9,189,669;
U.S. Pat. Nos. 9,195,844; 9,202,458;
U.S. Pat. Nos. 9,208,366; 9,208,367;
U.S. Pat. Nos. 9,219,836; 9,224,024;
U.S. Pat. Nos. 9,224,027; 9,230,140;
U.S. Pat. Nos. 9,235,553; 9,239,950;
U.S. Pat. Nos. 9,245,492; 9,248,640;
U.S. Pat. Nos. 9,250,652; 9,250,712;
U.S. Pat. Nos. 9,251,411; 9,258,033;
U.S. Pat. Nos. 9,262,633; 9,262,660;
U.S. Pat. Nos. 9,262,662; 9,269,036;
U.S. Pat. Nos. 9,270,782; 9,274,812;
U.S. Pat. Nos. 9,275,388; 9,277,668;
U.S. Pat. Nos. 9,280,693; 9,286,496;
U.S. Pat. Nos. 9,298,964; 9,301,427;
U.S. Pat. Nos. 9,313,377; 9,317,037;
U.S. Pat. Nos. 9,319,548; 9,342,723;
U.S. Pat. Nos. 9,361,882; 9,365,381;
U.S. Pat. Nos. 9,373,018; 9,375,945;
U.S. Pat. Nos. 9,378,403; 9,383,848;
U.S. Pat. Nos. 9,384,374; 9,390,304;
U.S. Pat. Nos. 9,390,596; 9,411,386;
U.S. Pat. Nos. 9,412,242; 9,418,269;
U.S. Pat. Nos. 9,418,270; 9,465,967;
U.S. Pat. Nos. 9,423,318; 9,424,454;
U.S. Pat. Nos. 9,436,860; 9,443,123;
U.S. Pat. Nos. 9,443,222; 9,454,689;
U.S. Pat. Nos. 9,464,885; 9,465,967;
U.S. Pat. Nos. 9,478,983; 9,481,186;
U.S. Pat. Nos. 9,487,113; 9,488,986;
U.S. Pat. Nos. 9,489,782; 9,490,540;
U.S. Pat. Nos. 9,491,729; 9,497,092;
U.S. Pat. Nos. 9,507,974; 9,519,814;
U.S. Pat. Nos. 9,521,331; 9,530,038;
U.S. Pat. Nos. 9,572,901; 9,558,386;
U.S. Pat. Nos. 9,606,581; 9,646,189;
U.S. Pat. Nos. 9,646,191; 9,652,648;
U.S. Pat. Nos. 9,652,653; 9,656,487;
U.S. Pat. Nos. 9,659,198; 9,680,282;
U.S. Pat. Nos. 9,697,401; 9,701,140;
U.S. Design Pat. No. D702,237;
U.S. Design Pat. No. D716,285;
U.S. Design Pat. No. D723,560;
U.S. Design Pat. No. D730,357;
U.S. Design Pat. No. D730,901;
U.S. Design Pat. No. D730,902;
U.S. Design Pat. No. D734,339;
U.S. Design Pat. No. D737,321;
U.S. Design Pat. No. D754,205;
U.S. Design Pat. No. D754,206;
U.S. Design Pat. No. D757,009;
U.S. Design Pat. No. D760,719;
U.S. Design Pat. No. D762,604;
U.S. Design Pat. No. D766,244;
U.S. Design Pat. No. D777,166;
U.S. Design Pat. No. D771,631;
U.S. Design Pat. No. D783,601;
U.S. Design Pat. No. D785,617;
U.S. Design Pat. No. D785,636;
U.S. Design Pat. No. D790,505;
U.S. Design Pat. No. D790,546;
International Publication No. 2013/163789;
U.S. Patent Application Publication No. 2008/0185432;
U.S. Patent Application Publication No. 2009/0134221;
U.S. Patent Application Publication No. 2010/0177080;
U.S. Patent Application Publication No. 2010/0177076;
U.S. Patent Application Publication No. 2010/0177707;
U.S. Patent Application Publication No. 2010/0177749;
U.S. Patent Application Publication No. 2010/0265880;
U.S. Patent Application Publication No. 2011/0202554;
U.S. Patent Application Publication No. 2012/0111946;
U.S. Patent Application Publication No. 2012/0168511;
U.S. Patent Application Publication No. 2012/0168512;
U.S. Patent Application Publication No. 2012/0193423;
U.S. Patent Application Publication No. 2012/0194692;
U.S. Patent Application Publication No. 2012/0203647;
U.S. Patent Application Publication No. 2012/0223141;
U.S. Patent Application Publication No. 2012/0228382;
U.S. Patent Application Publication No. 2012/0248188;
U.S. Patent Application Publication No. 2013/0043312;
U.S. Patent Application Publication No. 2013/0082104;
U.S. Patent Application Publication No. 2013/0175341;
U.S. Patent Application Publication No. 2013/0175343;
U.S. Patent Application Publication No. 2013/0257744;
U.S. Patent Application Publication No. 2013/0257759;
U.S. Patent Application Publication No. 2013/0270346;
U.S. Patent Application Publication No. 2013/0292475;
U.S. Patent Application Publication No. 2013/0292477;
U.S. Patent Application Publication No. 2013/0293539;
U.S. Patent Application Publication No. 2013/0293540;
U.S. Patent Application Publication No. 2013/0306728;
U.S. Patent Application Publication No. 2013/0306731;
U.S. Patent Application Publication No. 2013/0307964;
U.S. Patent Application Publication No. 2013/0308625;
U.S. Patent Application Publication No. 2013/0313324;
U.S. Patent Application Publication No. 2013/0332996;
U.S. Patent Application Publication No. 2014/0001267;
U.S. Patent Application Publication No. 2014/0025584;
U.S. Patent Application Publication No. 2014/0034734;
U.S. Patent Application Publication No. 2014/0036848;
U.S. Patent Application Publication No. 2014/0039693;
U.S. Patent Application Publication No. 2014/0049120;
U.S. Patent Application Publication No. 2014/0049635;
U.S. Patent Application Publication No. 2014/0061306;
U.S. Patent Application Publication No. 2014/0063289;
U.S. Patent Application Publication No. 2014/0066136;
U.S. Patent Application Publication No. 2014/0067692;
U.S. Patent Application Publication No. 2014/0070005;
U.S. Patent Application Publication No. 2014/0071840;
U.S. Patent Application Publication No. 2014/0074746;
U.S. Patent Application Publication No. 2014/0076974;
U.S. Patent Application Publication No. 2014/0097249;
U.S. Patent Application Publication No. 2014/0098792;
U.S. Patent Application Publication No. 2014/0100813;
U.S. Patent Application Publication No. 2014/0103115;
U.S. Patent Application Publication No. 2014/0104413;
U.S. Patent Application Publication No. 2014/0104414;
U.S. Patent Application Publication No. 2014/0104416;
U.S. Patent Application Publication No. 2014/0106725;
U.S. Patent Application Publication No. 2014/0108010;
U.S. Patent Application Publication No. 2014/0108402;
U.S. Patent Application Publication No. 2014/0110485;

U.S. Patent Application Publication No. 2014/0125853;
U.S. Patent Application Publication No. 2014/0125999;
U.S. Patent Application Publication No. 2014/0129378;
U.S. Patent Application Publication No. 2014/0131443;
U.S. Patent Application Publication No. 2014/0133379;
U.S. Patent Application Publication No. 2014/0136208;
U.S. Patent Application Publication No. 2014/0140585;
U.S. Patent Application Publication No. 2014/0152882;
U.S. Patent Application Publication No. 2014/0158770;
U.S. Patent Application Publication No. 2014/0159869;
U.S. Patent Application Publication No. 2014/0166759;
U.S. Patent Application Publication No. 2014/0168787;
U.S. Patent Application Publication No. 2014/0175165;
U.S. Patent Application Publication No. 2014/0191684;
U.S. Patent Application Publication No. 2014/0191913;
U.S. Patent Application Publication No. 2014/0197304;
U.S. Patent Application Publication No. 2014/0214631;
U.S. Patent Application Publication No. 2014/0217166;
U.S. Patent Application Publication No. 2014/0231500;
U.S. Patent Application Publication No. 2014/0247315;
U.S. Patent Application Publication No. 2014/0263493;
U.S. Patent Application Publication No. 2014/0263645;
U.S. Patent Application Publication No. 2014/0270196;
U.S. Patent Application Publication No. 2014/0270229;
U.S. Patent Application Publication No. 2014/0278387;
U.S. Patent Application Publication No. 2014/0288933;
U.S. Patent Application Publication No. 2014/0297058;
U.S. Patent Application Publication No. 2014/0299665;
U.S. Patent Application Publication No. 2014/0332590;
U.S. Patent Application Publication No. 2014/0351317;
U.S. Patent Application Publication No. 2014/0362184;
U.S. Patent Application Publication No. 2014/0363015;
U.S. Patent Application Publication No. 2014/0369511;
U.S. Patent Application Publication No. 2014/0374483;
U.S. Patent Application Publication No. 2014/0374485;
U.S. Patent Application Publication No. 2015/0001301;
U.S. Patent Application Publication No. 2015/0001304;
U.S. Patent Application Publication No. 2015/0009338;
U.S. Patent Application Publication No. 2015/0014416;
U.S. Patent Application Publication No. 2015/0021397;
U.S. Patent Application Publication No. 2015/0028104;
U.S. Patent Application Publication No. 2015/0029002;
U.S. Patent Application Publication No. 2015/0032709;
U.S. Patent Application Publication No. 2015/0039309;
U.S. Patent Application Publication No. 2015/0039878;
U.S. Patent Application Publication No. 2015/0040378;
U.S. Patent Application Publication No. 2015/0049347;
U.S. Patent Application Publication No. 2015/0051992;
U.S. Patent Application Publication No. 2015/0053769;
U.S. Patent Application Publication No. 2015/0062366;
U.S. Patent Application Publication No. 2015/0063215;
U.S. Patent Application Publication No. 2015/0088522;
U.S. Patent Application Publication No. 2015/0096872;
U.S. Patent Application Publication No. 2015/0100196;
U.S. Patent Application Publication No. 2015/0102109;
U.S. Patent Application Publication No. 2015/0115035;
U.S. Patent Application Publication No. 2015/0127791;
U.S. Patent Application Publication No. 2015/0128116;
U.S. Patent Application Publication No. 2015/0133047;
U.S. Patent Application Publication No. 2015/0134470;
U.S. Patent Application Publication No. 2015/0136851;
U.S. Patent Application Publication No. 2015/0142492;
U.S. Patent Application Publication No. 2015/0144692;
U.S. Patent Application Publication No. 2015/0144698;
U.S. Patent Application Publication No. 2015/0149946;
U.S. Patent Application Publication No. 2015/0161429;
U.S. Patent Application Publication No. 2015/0178523;
U.S. Patent Application Publication No. 2015/0178537;
U.S. Patent Application Publication No. 2015/0178685;
U.S. Patent Application Publication No. 2015/0181109;
U.S. Patent Application Publication No. 2015/0199957;
U.S. Patent Application Publication No. 2015/0210199;
U.S. Patent Application Publication No. 2015/0212565;
U.S. Patent Application Publication No. 2015/0213647;
U.S. Patent Application Publication No. 2015/0220753;
U.S. Patent Application Publication No. 2015/0220901;
U.S. Patent Application Publication No. 2015/0227189;
U.S. Patent Application Publication No. 2015/0236984;
U.S. Patent Application Publication No. 2015/0239348;
U.S. Patent Application Publication No. 2015/0242658;
U.S. Patent Application Publication No. 2015/0248572;
U.S. Patent Application Publication No. 2015/0254485;
U.S. Patent Application Publication No. 2015/0261643;
U.S. Patent Application Publication No. 2015/0264624;
U.S. Patent Application Publication No. 2015/0268971;
U.S. Patent Application Publication No. 2015/0269402;
U.S. Patent Application Publication No. 2015/0288689;
U.S. Patent Application Publication No. 2015/0288896;
U.S. Patent Application Publication No. 2015/0310243;
U.S. Patent Application Publication No. 2015/0310244;
U.S. Patent Application Publication No. 2015/0310389;
U.S. Patent Application Publication No. 2015/0312780;
U.S. Patent Application Publication No. 2015/0327012;
U.S. Patent Application Publication No. 2016/0014251;
U.S. Patent Application Publication No. 2016/0025697;
U.S. Patent Application Publication No. 2016/0026838;
U.S. Patent Application Publication No. 2016/0026839;
U.S. Patent Application Publication No. 2016/0040982;
U.S. Patent Application Publication No. 2016/0042241;
U.S. Patent Application Publication No. 2016/0057230;
U.S. Patent Application Publication No. 2016/0062473;
U.S. Patent Application Publication No. 2016/0070944;
U.S. Patent Application Publication No. 2016/0092805;
U.S. Patent Application Publication No. 2016/0101936;
U.S. Patent Application Publication No. 2016/0104019;
U.S. Patent Application Publication No. 2016/0104274;
U.S. Patent Application Publication No. 2016/0109219;
U.S. Patent Application Publication No. 2016/0109220;
U.S. Patent Application Publication No. 2016/0109224;
U.S. Patent Application Publication No. 2016/0112631;
U.S. Patent Application Publication No. 2016/0112643;
U.S. Patent Application Publication No. 2016/0117627;
U.S. Patent Application Publication No. 2016/0124516;
U.S. Patent Application Publication No. 2016/0125217;
U.S. Patent Application Publication No. 2016/0125342;
U.S. Patent Application Publication No. 2016/0125873;
U.S. Patent Application Publication No. 2016/0133253;
U.S. Patent Application Publication No. 2016/0171597;
U.S. Patent Application Publication No. 2016/0171666;
U.S. Patent Application Publication No. 2016/0171720;
U.S. Patent Application Publication No. 2016/0171775;
U.S. Patent Application Publication No. 2016/0171777;
U.S. Patent Application Publication No. 2016/0174674;
U.S. Patent Application Publication No. 2016/0178479;
U.S. Patent Application Publication No. 2016/0178685;
U.S. Patent Application Publication No. 2016/0178707;
U.S. Patent Application Publication No. 2016/0179132;
U.S. Patent Application Publication No. 2016/0179143;
U.S. Patent Application Publication No. 2016/0179368;
U.S. Patent Application Publication No. 2016/0179378;
U.S. Patent Application Publication No. 2016/0180130;
U.S. Patent Application Publication No. 2016/0180133;
U.S. Patent Application Publication No. 2016/0180136;
U.S. Patent Application Publication No. 2016/0180594;

U.S. Patent Application Publication No. 2016/0180663;
U.S. Patent Application Publication No. 2016/0180678;
U.S. Patent Application Publication No. 2016/0180713;
U.S. Patent Application Publication No. 2016/0185136;
U.S. Patent Application Publication No. 2016/0185291;
U.S. Patent Application Publication No. 2016/0186926;
U.S. Patent Application Publication No. 2016/0188861;
U.S. Patent Application Publication No. 2016/0188939;
U.S. Patent Application Publication No. 2016/0188940;
U.S. Patent Application Publication No. 2016/0188941;
U.S. Patent Application Publication No. 2016/0188942;
U.S. Patent Application Publication No. 2016/0188943;
U.S. Patent Application Publication No. 2016/0188944;
U.S. Patent Application Publication No. 2016/0189076;
U.S. Patent Application Publication No. 2016/0189087;
U.S. Patent Application Publication No. 2016/0189088;
U.S. Patent Application Publication No. 2016/0189092;
U.S. Patent Application Publication No. 2016/0189284;
U.S. Patent Application Publication No. 2016/0189288;
U.S. Patent Application Publication No. 2016/0189366;
U.S. Patent Application Publication No. 2016/0189443;
U.S. Patent Application Publication No. 2016/0189447;
U.S. Patent Application Publication No. 2016/0189489;
U.S. Patent Application Publication No. 2016/0192051;
U.S. Patent Application Publication No. 2016/0202951;
U.S. Patent Application Publication No. 2016/0202958;
U.S. Patent Application Publication No. 2016/0202959;
U.S. Patent Application Publication No. 2016/0203021;
U.S. Patent Application Publication No. 2016/0203429;
U.S. Patent Application Publication No. 2016/0203797;
U.S. Patent Application Publication No. 2016/0203820;
U.S. Patent Application Publication No. 2016/0204623;
U.S. Patent Application Publication No. 2016/0204636;
U.S. Patent Application Publication No. 2016/0204638;
U.S. Patent Application Publication No. 2016/0227912;
U.S. Patent Application Publication No. 2016/0232891;
U.S. Patent Application Publication No. 2016/0292477;
U.S. Patent Application Publication No. 2016/0294779;
U.S. Patent Application Publication No. 2016/0306769;
U.S. Patent Application Publication No. 2016/0314276;
U.S. Patent Application Publication No. 2016/0314294;
U.S. Patent Application Publication No. 2016/0316190;
U.S. Patent Application Publication No. 2016/0323310;
U.S. Patent Application Publication No. 2016/0325677;
U.S. Patent Application Publication No. 2016/0327614;
U.S. Patent Application Publication No. 2016/0327930;
U.S. Patent Application Publication No. 2016/0328762;
U.S. Patent Application Publication No. 2016/0330218;
U.S. Patent Application Publication No. 2016/0343163;
U.S. Patent Application Publication No. 2016/0343176;
U.S. Patent Application Publication No. 2016/0364914;
U.S. Patent Application Publication No. 2016/0370220;
U.S. Patent Application Publication No. 2016/0372282;
U.S. Patent Application Publication No. 2016/0373847;
U.S. Patent Application Publication No. 2016/0377414;
U.S. Patent Application Publication No. 2016/0377417;
U.S. Patent Application Publication No. 2017/0010141;
U.S. Patent Application Publication No. 2017/0010328;
U.S. Patent Application Publication No. 2017/0010780;
U.S. Patent Application Publication No. 2017/0016714;
U.S. Patent Application Publication No. 2017/0018094;
U.S. Patent Application Publication No. 2017/0046603;
U.S. Patent Application Publication No. 2017/0047864;
U.S. Patent Application Publication No. 2017/0053146;
U.S. Patent Application Publication No. 2017/0053147;
U.S. Patent Application Publication No. 2017/0053647;
U.S. Patent Application Publication No. 2017/0055606;
U.S. Patent Application Publication No. 2017/0060316;
U.S. Patent Application Publication No. 2017/0061961;
U.S. Patent Application Publication No. 2017/0064634;
U.S. Patent Application Publication No. 2017/0083730;
U.S. Patent Application Publication No. 2017/0091502;
U.S. Patent Application Publication No. 2017/0091706;
U.S. Patent Application Publication No. 2017/0091741;
U.S. Patent Application Publication No. 2017/0091904;
U.S. Patent Application Publication No. 2017/0092908;
U.S. Patent Application Publication No. 2017/0094238;
U.S. Patent Application Publication No. 2017/0098947;
U.S. Patent Application Publication No. 2017/0100949;
U.S. Patent Application Publication No. 2017/0108838;
U.S. Patent Application Publication No. 2017/0108895;
U.S. Patent Application Publication No. 2017/0118355;
U.S. Patent Application Publication No. 2017/0123598;
U.S. Patent Application Publication No. 2017/0124369;
U.S. Patent Application Publication No. 2017/0124396;
U.S. Patent Application Publication No. 2017/0124687;
U.S. Patent Application Publication No. 2017/0126873;
U.S. Patent Application Publication No. 2017/0126904;
U.S. Patent Application Publication No. 2017/0139012;
U.S. Patent Application Publication No. 2017/0140329;
U.S. Patent Application Publication No. 2017/0140731;
U.S. Patent Application Publication No. 2017/0147847;
U.S. Patent Application Publication No. 2017/0150124;
U.S. Patent Application Publication No. 2017/0169198;
U.S. Patent Application Publication No. 2017/0171035;
U.S. Patent Application Publication No. 2017/0171703;
U.S. Patent Application Publication No. 2017/0171803;
U.S. Patent Application Publication No. 2017/0180359;
U.S. Patent Application Publication No. 2017/0180577;
U.S. Patent Application Publication No. 2017/0181299;
U.S. Patent Application Publication No. 2017/0190192;
U.S. Patent Application Publication No. 2017/0193432;
U.S. Patent Application Publication No. 2017/0193461;
U.S. Patent Application Publication No. 2017/0193727;
U.S. Patent Application Publication No. 2017/0199266;
U.S. Patent Application Publication No. 2017/0200108; and
U.S. Patent Application Publication No. 2017/0200275.

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:
1. A system, comprising:
a mobile terminal comprising a charging pad;
a charging cradle comprising a two pin POGO connector, a spring flat, and a printed circuit board,
the two pin POGO connector comprising a GND pin and a VDD pin with the GND pin and the VDD pin each comprising a plunger, a coil spring and a barrel, and
the spring flat enables or disables power applied to the charging pad; and
the printed circuit board with through holes, wherein barrels of the two pin POGO connector are soldered around the through holes on one side of the printed circuit board, such that the pins can pass through the through holes, and the spring flat soldered on an opposite side of the printed circuit board in proximity to a through hole associated with the GND pin, wherein, if the mobile terminal is docked to the charging cradle, the charging pad is connected to at least the two pin POGO connector, wherein, if a separate force caused by the mobile terminal is applied to the plunger of the GND pin, the GND pin is in contact with the spring flat causing the mobile terminal to begin charging.

2. The system as in claim 1, wherein, the coil spring generates a pressure that prevents the plunger of the GND pin from extending out of the barrel on the opposite side of the printed circuit board, unless the separate force caused by the mobile terminal is applied to the plunger of the GND pin.

3. The system as in claim 2, wherein,
if the separate force caused by the mobile terminal is applied to the plunger of the GND pin, the separate force overcomes the pressure of the coil spring and causes the plunger of the GND pin to extend out of the barrel of the GND pin.

4. The system as in claim 1, wherein, if the mobile terminal is not docked to the charging cradle, the plunger of the GND pin is not connected to the spring flat.

5. The system as in claim 1, comprising, a power block that is coupled to the spring flat.

6. The system as in claim 1, wherein, if the charging pad is connected to the GND pin before connecting the spring flat to the GND pin, an occurrence of electrical arcing at the charging pad of the mobile terminal is minimized.

7. A charging cradle, comprising:
a two pin connector comprising a GND pin and a VDD pin with the GND pin and the VDD pin each comprising a plunger, a coil spring and a barrel;
a spring flat capable of enabling or disabling power to the charging cradle by connecting to a power block; and
a printed circuit board with the two pin connector located on one side of the printed circuit board, and the spring flat located on an opposite side of the printed circuit board,
wherein, after the plunger of the GND pin connects with a device, a force is then applied to the plunger of the GND pin causing the plunger of the GND pin to extend through a hole of the printed circuit board and causing the GND pin to be connected with the spring flat, and
wherein, power is then applied to the GND pin to charge the device.

8. The charging cradle as in claim 7, wherein, the power block is coupled to the spring flat to provide power.

9. The charging cradle as in claim 7, wherein,
if the plunger of the GND pin is not connected to the spring flat, the power is not applied to the device.

10. The charging cradle as in claim 7, wherein,
if the device is docked with the charging cradle, the plunger of the GND pin extends to the opposite side of the printed circuit board, causing a connection with the spring flat.

11. The charging cradle as in claim 7, wherein,
the device is a mobile terminal.

12. A method, comprising the steps of:
constructing a charging cradle with a two pin connector, a spring flat and a printed circuit board
positioning the two pin connector on one side of the printed circuit board, wherein the two pin connector comprises a GND pin and a VDD pin with the GND pin and the VDD pin each comprising a plunger, a coil spring and a barrel;
positioning the spring flat on an opposite side of the printed circuit board in proximity to the GND pin, wherein the spring flat is coupled to a power block; and
charging the mobile terminal based on a docketing status of the mobile terminal and the charging cradle,
wherein, by connecting a charging pad of the mobile terminal to the GND pin before connecting the spring flat to the GND pin, an occurrence of electrical arcing at the charging pad of the mobile terminal is minimized.

13. The method according to claim 12, comprising the step of:
not docking the mobile terminal with the charging cradle,
wherein, since the spring flat is not connected with the GND pin, the power block is not active, and power is not applied to the two pin connector.

14. The method according to claim 12, comprising the step of:
initially docking the mobile terminal with the charging cradle, causing the plunger of the GND pin to contact with the charging pad of the mobile terminal, and
wherein, since the plunger of the GND pin does not extend to cause the spring flat to connect with the GND pin, the power block is not active, and power is not applied to the two pin connector.

15. The method according to claim 12, comprising the step of:
docking the mobile terminal with the charging cradle; and
pressing the plunger of the GND pin to extend to the opposite side of the printed circuit board to allow the GND pin to be connected to the spring flat,
wherein, since the power block is active and power is applied to the two pin connector of the charging cradle, the charging cradle begins to charge the mobile terminal.

16. The method according to claim 15, comprising the step of:
further pressing the plunger of the GND pin to extend the plunger of the GND pin a maximum distance on the other side of the printed circuit board,
wherein, since the spring flat remains connected with the GND pin, the power block remains active, and power from the two pin connector of the charging cradle continues to be applied to the mobile terminal,
wherein, if the spring flat vibrates, the mobile terminal continues to charge the mobile terminal.

17. The method according to claim 12, comprising the step of:
removing the mobile terminal from the charging cradle, causing a disconnect of the plunger of the GND pin with the spring flat,
wherein, since the spring flat is not connected with the GND pin earlier than the plunger of a ground pin to disconnect with the charging pad of the mobile terminal, the power block is not active, and the charging cradle stops charging the mobile terminal,
wherein, the charging pad of the mobile terminal and the two pin connector remain connected during removal of the mobile terminal from the charging cradle.

18. The method according to claim 17, comprising the step of:
removing the mobile terminal from the charging cradle, causing the plunger of a ground pin to disconnect with charging pad of the mobile terminal,
wherein, since the spring flat is not connected with GND pin, the power block is not active, and there is no power applied to the two pin connector during removal of the mobile terminal from the charging cradle.

19. The method according to claim 12,
wherein, barrels of two pin connector are soldered around through holes on the one side of the printed circuit board, and
wherein, a pressure of the coil spring prevents the plunger of the GND pin from extending out of its barrel on the opposite side of the printed circuit board.

20. The method according to claim 12,
wherein, if a force is applied to the plunger of the GND pin, the plunger of the GND pin extends through a hole in the printed circuit board and is connected to the spring flat causing the GND pin to be coupled to the power block.

* * * * *